United States Patent
Abdallah et al.

(10) Patent No.: US 10,194,369 B2
(45) Date of Patent: Jan. 29, 2019

(54) ROUTING DATA PACKETS IN WIRELESS NETWORKS WITH DIRECTIONAL TRANSMISSIONS

(71) Applicant: SONY CORPORATION, Tokyo (JP)

(72) Inventors: Ramy Medhat Abdallah, San Jose, CA (US); Kazuyuki Sakoda, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 191 days.

(21) Appl. No.: 15/212,209

(22) Filed: Jul. 16, 2016

(65) Prior Publication Data
US 2018/0020389 A1    Jan. 18, 2018

(51) Int. Cl.
  *H04W 40/02*    (2009.01)
  *H04W 40/24*    (2009.01)
  *H04W 84/18*    (2009.01)
  *H04B 7/06*     (2006.01)
  *H04L 12/733*   (2013.01)
  *H04L 12/721*   (2013.01)
  (Continued)

(52) U.S. Cl.
  CPC ............ *H04W 40/02* (2013.01); *H04B 7/063* (2013.01); *H04B 7/0617* (2013.01); *H04L 45/122* (2013.01); *H04L 45/26* (2013.01); *H04L 45/745* (2013.01); *H04W 40/246* (2013.01); *H04W 84/18* (2013.01)

(58) Field of Classification Search
  CPC . H04W 72/12; H04W 24/10; H04W 28/0221; H04W 52/0229; H04W 52/0245; H04W 52/0274; H04W 56/0005; H04W 72/04; H04W 72/0413; H04W 72/042; H04W 72/0446; H04W 76/025; H04W 76/15; H04W 76/28; H04W 88/02; H04W 88/08
  USPC ........................................................ 370/388
  See application file for complete search history.

(56) References Cited

U.S. PATENT DOCUMENTS 7,787,429 B2    8/2010 Jeon et al.
8,422,961 B2    4/2013 Kafle
(Continued)

OTHER PUBLICATIONS

ISA/EPO, European Patent Office, International Search Report and Written Opinion dated Oct. 19, 2017, related PCT international application No. PCT/US2017/040923, pp. 1-13, with claims searched, pp. 14-17.
(Continued)

*Primary Examiner* — Natasha W Cosme
(74) *Attorney, Agent, or Firm* — O'Banion & Ritchey LLP; John P. O'Banion

(57) ABSTRACT

An apparatus and method for communicating via a routing protocol in a wireless network having directional transmission capabilities. Reliable peer stations are identified using Beamforming (BF) training feedback metrics. Routing discovery messages are transmitted by unicast to reliable peer stations, with neighborhood discovery lists disseminated among peer stations in a unicast mode. From the above information, routing tables are constructed with best routing between a source and a destination station, wherein messages can be routed using said routing table from a source peer station, through intermediate peer stations, to a destination peer station. In addition, other embodiments are described, including a simplified two-hop routing apparatus and method.

29 Claims, 17 Drawing Sheets

(51) Int. Cl.
*H04L 12/745* (2013.01)
*H04L 12/741* (2013.01)

(56) References Cited

U.S. PATENT DOCUMENTS

2010/0238824 A1* 9/2010 Farajidana ........... H04B 7/0417
370/252
2015/0382275 A1 12/2015 Pragada et al.

OTHER PUBLICATIONS

Matyjas, John D. et al., "Wireless Network Performance Enhancement via Direction Antennas", Chapter 5.4 IEEE 802.1ad Medium Access Control (MAC) Protocols, CRC Press, pp. 106-113, Nov. 18, 2015.
Sulaiman, Safna et al., "A Neighbor Coverage-Based Rebroadcast in MANETs Based on Energy Efficient Rebroadcast Probability", International Journal of Innovative Research in Electronics and Communications, vol. 1, No. 1, Oct. 31, 2014, pp. 1-8.
Chen, Zhuo, "60 gHz MAC and network design", Retrieved from http://dx.doi.org/doi:10.7282/T3DV1MZT, Rutgers, The State University of New Jersey, Jan. 2016, pp. 1-128.
Chu, HongYun et al., "Relay selection with feedback beamforming information through designed sector sweep report frame for mmWave WPANs", Science China Information Sciences, Aug. 2014, vol. 57, Issue 8, pp. 1-14, first published online Jun. 21, 2014.

* cited by examiner

| Frame control | Duration | RA | TA | RREQ IE | FCS |
RREQ frame format
FIG. 1
| Frame control | Duration | RA | TA | RREP IE | FCS |
RREP frame format
FIG. 2
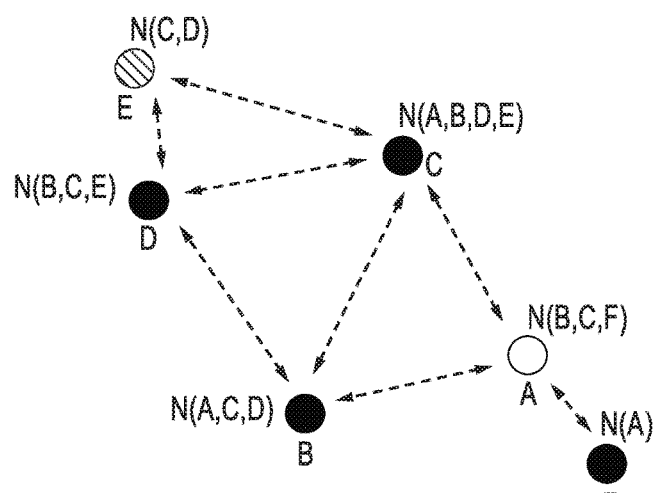
FIG. 3
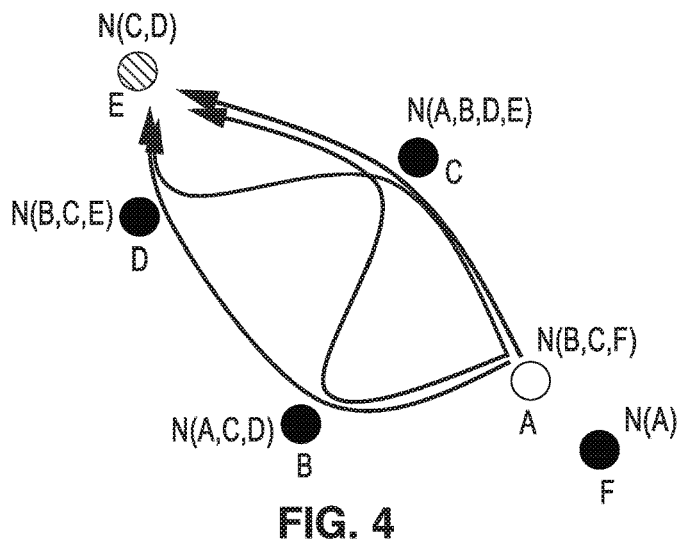
FIG. 4

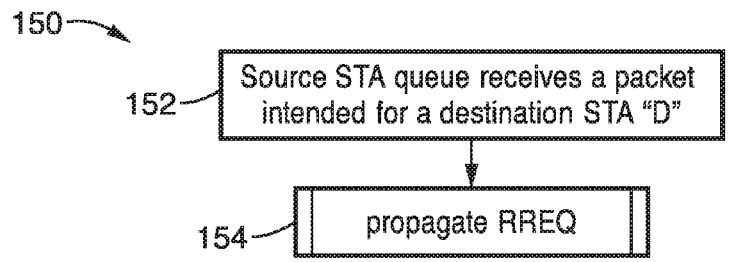
FIG. 14
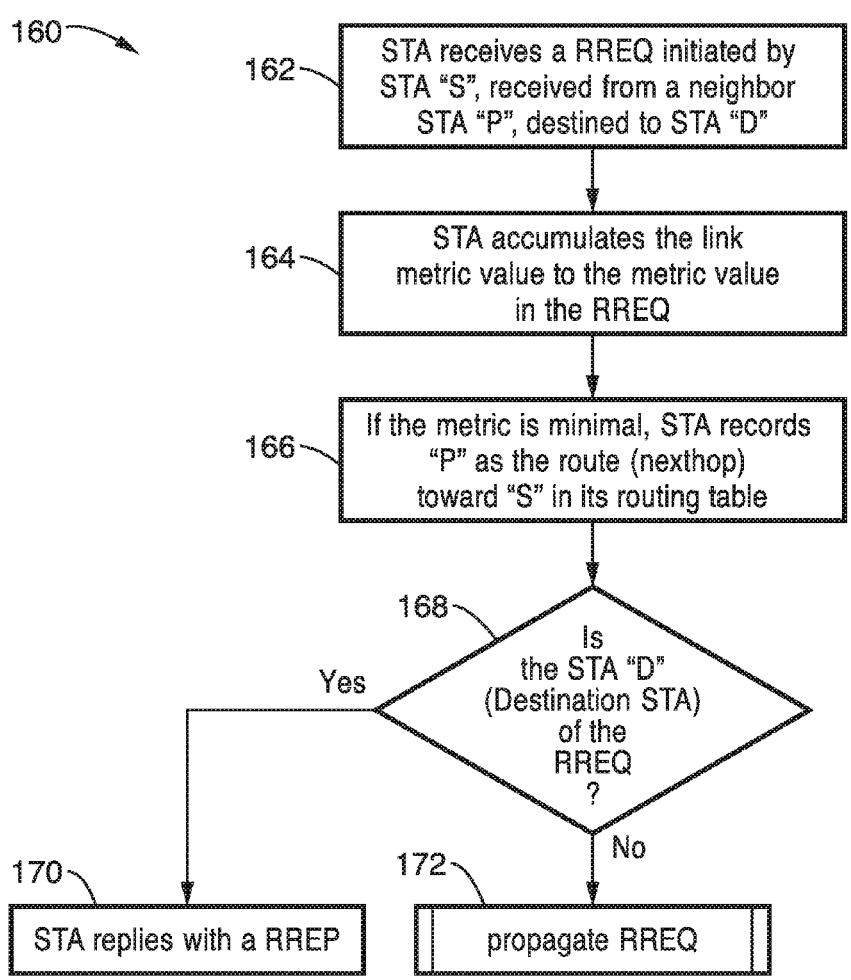
FIG. 15A
FIG. 15B

ROUTING DATA PACKETS IN WIRELESS NETWORKS WITH DIRECTIONAL TRANSMISSIONS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless networking, and more particularly to a routing apparatus and method for use in a wireless network having beamformed communications.

2. Background Discussion

As there is a need for maximizing communication in decentralized networks, efficient means have been sought for determining best message routing paths.

In decentralized networks, e.g. ad-hoc or mesh networks, data is routed from a source STA to a destination STA in multiple hops through intermediate relays. Routing is the process of selecting the best routes (paths) in the network, such as disseminating information that enables selecting routes between any two STAs on the network, from a source STA to a destination STA. A routing protocol involves methods for path selection through certain metrics. A large variety of routing protocols have been developed to address different network topologies, network dynamics, complexity of methods, and so forth.

Millimeter-wave (mmWave) communications link budgets are poor due to high free space path loss (FSPL), large $O_2/H_2O$ absorption, and large blockage by objects. The use of highly directional (directive) communications, also known as beamforming, takes advantage of a large number of antennas (e.g., an antenna array) to steer transmission towards a desired radio direction. Beamforming is utilized to overcome link budget limitations.

However, state-of-the art routing which heavily relies on multicasting will not function as intended in these mmWave wireless networks. Beamforming in mmWave networks currently requires that the signal transmitted by a wireless device be intended only to another single device. Hence, current schemes for multicasting or broadcasting of information in prevailing wireless networks, such as WLAN at 2.4/5 GHz, cannot be used directly in mmWave wireless systems.

Accordingly, a need exists for methods for discovering a routing path to a destination while effectively allowing directional forwarding of data packets through a number of STAs. The present disclosure fulfills these needs, while providing additional wireless networking benefits.

BRIEF SUMMARY

A method and apparatus for use on wireless networks for performing routing protocols tailored for directional transmissions. The general elements of these protocols are as follows. (a) Using Beamforming training feedback metrics to identify and rank reliable peer STAs. (b) Transmit routing requests in unicast mode to reliable peers. (c) Dissemination of neighborhood discovery lists among STAs in unicast transmission. (d) Construction of routing tables that extract (determine/estimate) best routes between a source and a destination using the aggregated neighbor lists. (e) Use of a ranking of links based on BF training feedback to transmit routing requests in a specific order.

A number of terms are utilized in the disclosure whose meanings are generally utilized as described below.

AODV: Ad-hoc On-Demand Distance Vector, is a routing protocol for data packets in ad-hoc wireless networks.

Beamforming (BF): A directional transmission that does not use an omnidirectional antenna pattern or quasi-omni antenna pattern. It is used at a transmitter to improve the received signal power or signal-to-noise ratio (SNR) at an intended receiver.

Multi-cast: In networking this is a one-to-many form of group communication implemented at layers above the physical layer where information is addressed to a group of destination STAs simultaneously.

NL: Neighbor List, is a list of neighbor STA links for a given STA that exchanged either BF training or "Hello" messages with that given STA.

Omni directional: A non-directional antenna mode of transmission.

Quasi-omni directional: A directional multi-gigabit (DMG) antenna operating mode with the widest beamwidth attainable.

RREQ: Routing Request, is a packet used in data routing protocols to discover the path between the source STA and the destination STA.

RREP: Routing Reply, is a packet transmitted in response to RREQ in routing protocols. Upon reception of RREP by a source STA it can start transmitting the data packets.

Receive sector sweep (RXSS): Reception of Sector Sweep (SSW) frames through (via) different sectors, in which a sweep is performed between consecutive receptions.

RSSI: receive signal strength indicator (in dBm).

Sector-level sweep (SLS) phase: A BF training phase that can include as many as four components: (1) an initiator sector sweep (ISS) to train the initiator, (2) a responder sector sweep (RSS) to train the responder link, (3) an SSW Feedback, and (4) an SSW ACK.

SNR: The received signal-to-noise ratio (in dB). Other similar mechanisms for determining signal integrity are considered to be cumulative and/or synonymous with SNR, and are thus not separately described herein.

STA: Station: a logical entity that is a singly addressable instance of a medium access control (MAC) and physical layer (PHY) interface to the wireless medium (WM).

Unicast: In networking, unicast is a one-to-one communication connection between two STAs.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1 is a data field format for a Routing Request (RREQ) as utilized in state of the art routing protocols, e.g. AODV protocol.

FIG. 2 is a data field format for Routing Replies (RREP) as utilized in state of the art routing protocols, e.g. AODV protocol.

FIG. 3 is a radio node diagram of an example network by way of example in discussing embodiments according to the present disclosure.

FIG. 4 is a routing path diagram for the example radio node diagram shown in FIG. 3.

FIG. 14 is a data field format for a neighbor link (NL) information element (IE) according to an embodiment of the present disclosure.

FIG. 15A and FIG. 15B are flow diagrams of processing routing requests (RREQs) for transmission and reception according to an embodiment of the present disclosure.

DETAILED DESCRIPTION

Figure 5:
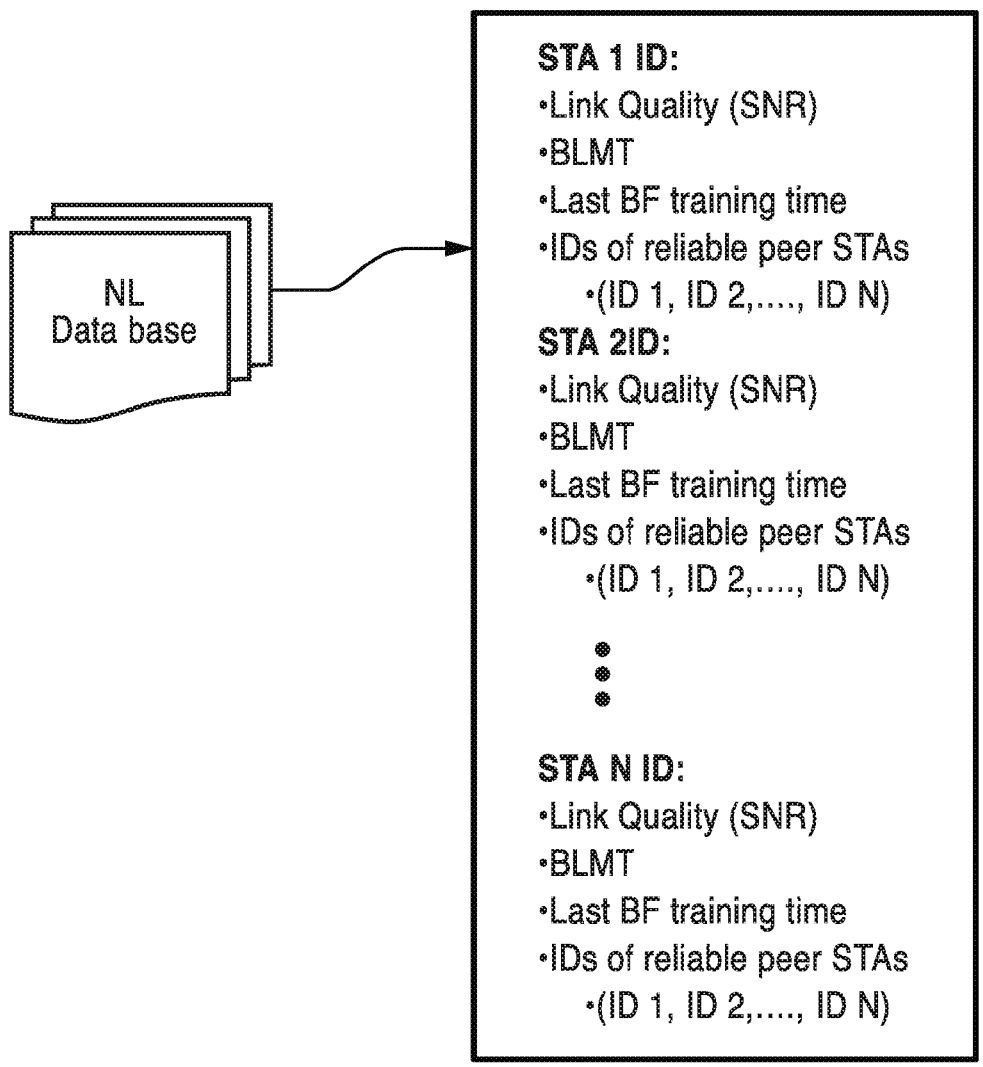
FIG. 5 is a data base record example for a neighbor list according to an embodiment of the present disclosure.

1. State of the Art AODV Routing and Path Discovery

This section provides an overview of On-Demand Distance Vector (AODV) Routing.

Numerous routing methods are described in the literature. One of the more prominent routing protocols is Ad-hoc On-Demand Distance Vector (AODV) routing. This protocol has been adopted by the ZigBee standard for routing of low power wireless personal area networks (WPAN).

The major components of AODV are: (a) Neighborhood Discovery, and (b) Path Discovery. AODV does not require a periodic advertisement of routing information from all STAs; whereby the overhead required for path discovery is limited. However, as it is clear from its moniker, AODV depends on "On-Demand" routing, triggered by packets needed to be transmitted to a destination STA.

At the core of AODV is the path discovery mechanism. Path discovery is triggered whenever a source STA needs to communicate with another STA for which it has no routing information.

The simplified steps of path discovery are as follows. (1) Source STA broadcasts routing requests (RREQ) to its neighbors. (2) Each neighbor that hears the RREQ either agrees to the RREQ and sends back a route reply (RREP) or rebroadcasts the RREQ to its own neighbors after modifying the RREQ metric. (3) Eventually, the RREQ will arrive at the destination STA. The destination STA unicasts a RREP back to its neighbors from which it received the RREQ. (4) Each STA receiving the RREP sets up a forward pointer to the STA it received the RREP from. It propagates the RREP towards the source. (5) The source STA starts data transmission upon arrival of the first RREP. It can later update the routing information if it learns of a better route.

FIG. 1 and FIG. 2 illustrate the data format for Routing Requests (RREQ) and Routing Replies (RREP) in these current systems. In FIG. 1 the RREQ message is shown containing the following fields. Frame Control is a field containing information about the type of the frame, power management information, and retried frame. Duration indicates the duration of the frame in microseconds. The RA field is a MAC address that identifies the intended recipient station (STA), which is a neighbor STA. In this case the RA is set to a unicast neighbor STA address. The TA field is a MAC transmitter address that identifies the STA that is transmitting this frame. RREQ IE is an routing request (RREQ) information element (IE) containing the following subfields: (a) Source (originator) STA address, (b) Source sequence number, (c) Broadcast ID, (d) Destination (final) STA address, (e) Destination sequence number, (f) Metric (e.g. hop count or airtime). The FCS field is a frame check sequence that validates the reception of the frame contents.

In FIG. 2 the routing reply (RREP) message contains the following fields. Frame Control is a field containing information about the type of the frame, power management information, retried frame, and so forth. Duration indicates the duration of the frame in microseconds. The RA field is a MAC address that identifies the intended recipient station (STA), which is a neighbor STA. In this case the RA is set to a unicast neighbor STA address. The TA field is a MAC transmitter address that identifies the STA that is transmitting this frame. The routing reply (RREP) information element (IE) is an information element containing the following subfields: (a) Source (originator) STA address, (b) Destination (final) address, (c) Destination sequence number, (d) lifetime, (e) Metric (e.g. hop count or airtime). The FCS field is a frame check sequence that validates the reception of the frame contents.

The following regards subfields of the RREQ IE and RREP IE fields. The broadcast ID is a counter that in incremented whenever the source issues a new RREQ. Thus, this subfield uniquely identifies a specific RREQ from the source STA. The source (destination) sequence number is a counter that is used to maintain freshness information about the reverse (forward) route to the source (destination). The hop count metric is incremented every time the RREQ is broadcasted by a STA to its neighbor STAs. Lifetime is the time for which nodes receiving the RREP consider the route to be valid.

Neighborhood discovery, or local connectivity management, is an underlying process for routing in ad-hoc and mesh networks. This is a proactive routing step that results in allowing STAs to know the nodes that are within their connectivity range, also referred to as their "neighborhood". Network STAs learn their neighborhoods in two ways. (1) The neighborhood is learned whenever an STA receives a broadcast from a neighbor, it updates its "neighborhood list" (NL) to ensure that it includes this neighbor. (2) Otherwise, an STA periodically broadcasts a hello message, containing identity of the STA, to its neighbors. In some implementations, each STA also broadcasts some of the information from its neighborhood list. STAs aggregate knowledge of NL and information from RREQ and RREP to maintain a routing table. By way of example and not limitation, each route table may contain information about: destination, next hop, metric, active neighbors for this route and expiration time for the route table entry.

2. Introduction of Present Disclosure 2.1 Handling of Unicast Routing Requests.

The elements of routing data in a mesh network with directional transmissions are: (1) Unicast Routing Request (RREQ), (2) Routing Reply (RREP), and Neighbor List (NL).

Unlike broadcast/multicast RREQ of state-of-the-art routing protocols, in the unicast RREQ, the RREQ is directed towards one STA at a time. It is transmitted with beamforming where it is assumed that BF training has been established between the network STAs. For compatibility the RREP can be the same as utilized in state-of-the art protocols. The Neighbor list (NL) is a list of neighbor STAs that every STA shares with its neighbors.

2.2 Unicast Routing Requests Via Neighbor List Announcement.

The mesh network formation follows both proactive and reactive steps. In the proactive steps, upon expiration of a periodic timer, each STA transmits the neighbor list (NL) information to its peers sequentially with beamformed transmissions. The transmitted list includes only reliable peer STAs to the STA transmitting this frame. Reliable peers are the STAs that can be determined from the BF training that is assumed to have taken place between the stations.

FIG. 3 depicts an example ad-hoc wireless network in which a group of STAs (A-F) are in the same neighborhood. In the following section examples are described of reactive routing, considering in this case that STA A is the source, while STA E is the destination, and STAs B, C, and D are potential relay STAs. Steps of propagating the RREQ from source STA to destination STA based on NL of each STA are: (i) A to C and A to B; (ii) B to C and B to D; (iii) C to D, C to E, and D to E. It will be noted that STA F, being in the opposite direction to the destination, does not show up in these routing paths to the destination.

FIG. 4 is a routing path diagram for the ad-hoc wireless network shown in FIG. 3. The following is a non-inclusive list of resultant routing paths after full propagation of RREQ and RREP, which are seen by the arrow paths in the figure. (a) A→C→E; (b) A→C→D→E; (c) A→B→D→E; (d) A→B→C→E.

Source STA is based on the metric specified in RREQ and RREP which picks a single route to transmit data to the destination STA, for instance (a) A→C→E. At each node (STA) of the figure, the neighbors are depicted, for example the neighbors at STA E are STA C and STAT D (N(C,D)), while at STA C neighbors are A, B, D and E, and so forth as depicted.

FIG. 5 illustrates an example neighbor list data base showing information record entries stored for multiple stations, which by way of illustration are represented as STA 1, STA 2 and through to STA N. By way of example and not limitation, the data stored for each station entry is shown comprising Link quality (e.g., SNR), BLMT, last BF training time, IDs of reliable peer STAs (e.g., ID 1, ID 2, , , , ID N).

Figure 6:
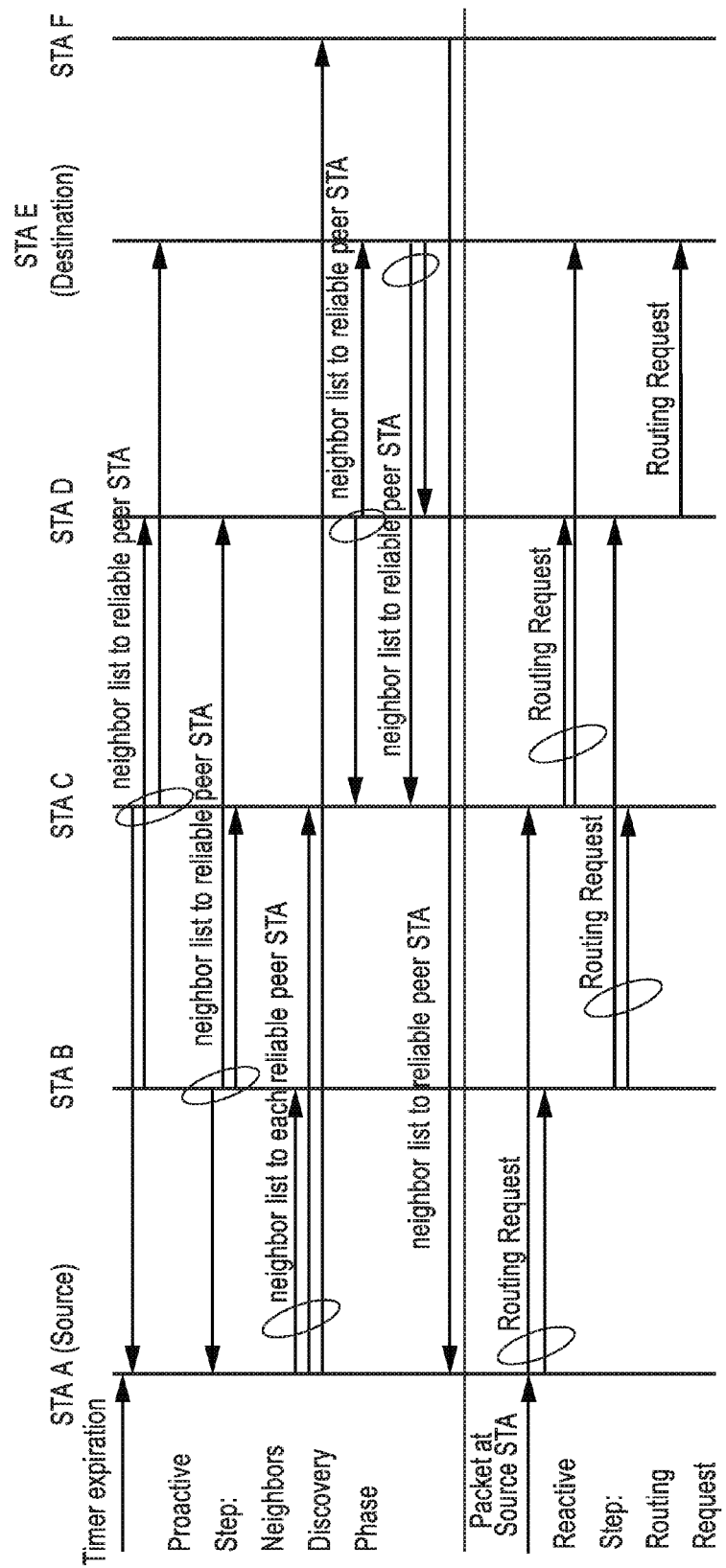
FIG. 6 is a message passing diagram of proactive and reactive steps in forming a route from source to destination according to an embodiment of the present disclosure.

FIG. 6 illustrates an example signaling sequence of forming a route from a source STA (i.e., STA A) to a destination STA (i.e., STA E). Each of the example STAs (A through F) are depicted along the top of the chart, with the upper portion of the chart showing the proactive step of neighbor discovery phase, while the reactive steps are shown at the bottom portion of the table. In this example the proactive stage is seen being entered in response to a periodic timer expiration. The timer is running in the STA, such as over a processor inside the STA, to determine time driven events and initiate a processing event when the timer expires (fires). The timer is programmed to fire periodically to kick the proactive step of the signaling. During the proactive phase, each STA is seen communicating a neighbor list (NL) to a reliable peer STA. It will be seen that STA F is only communicating with STA A, as the other STAs are not reliable peer STAs for this example case.

Referring to the center of the chart, a data packet is available at the source STA (STA A), destined to STA E, and the reactive step commences as STA A sends a routing request (RREQ) to STA B and to STA C. Then STA B sends routing requests (RREQ) to each of STA C and STA D, while STA C is sending routing requests (RREQ) to each of STA D and STA E. When the routing request is received by STA D, then it is seen sending a routing request to STA E.

2.3 Making Decisions on Reliable Peer Stations.

A unique aspect of routing protocols in wireless networks with directional transmission is the dependence on BF training information to decide which neighbor STAs are reliable so that an RREQ is forwarded to them. This is one of the important elements which distinguishes the present disclosure from previous work.

There is a trade-off between bandwidth utilization and probability of forming a routing path to a destination when deciding on reliable peer STAs. Using a loose reliability condition leads to possibly forwarding the RREQ to a large number of STAs, thus increasing the probability of forming a route to a destination STA. However, using a tighter reliability condition limits selection of STAs which reduces overhead, and its bandwidth utilization, in forming a route to the destination STA.

Figure 7:
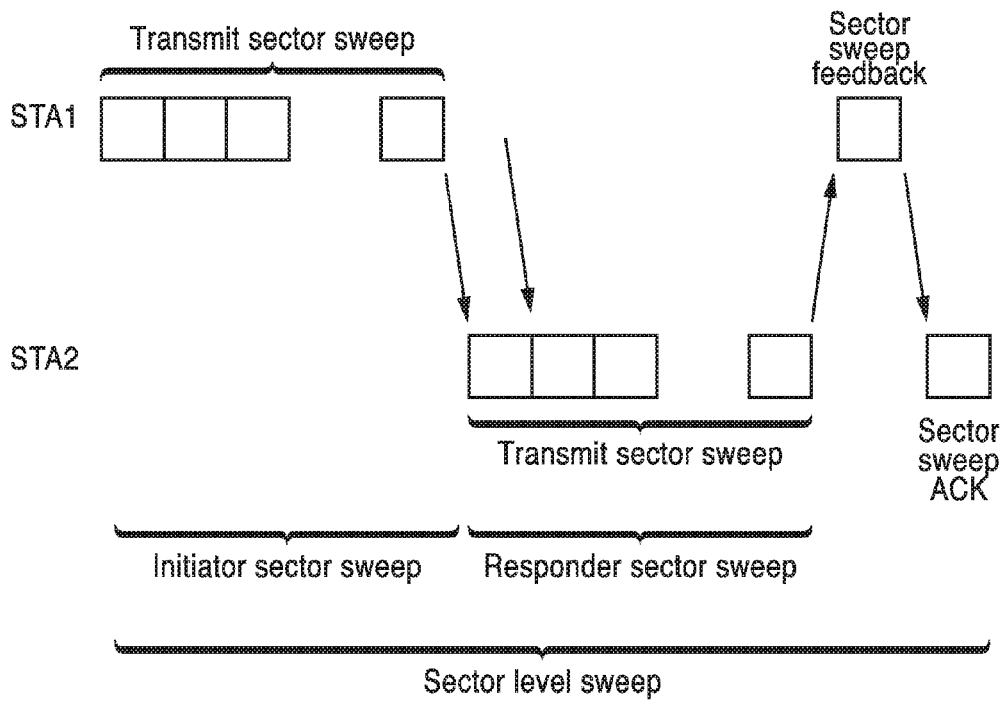
FIG. 7 is an air time diagram of sector level sweep (SLS) in Beamformed training between transmitter (STA 1) and responder (STA 2).

FIG. 7 illustrates a Sector Level Sweep (SLS) beamforming (BF) training protocol between a first station (STA 1) and a second station (STA 2). A transmit sector sweep (TXSS) is seen for a first station (STA 1) as an initiator sector sweep, and another station (STA 2) responds with its own TXSS. STA 1 then generates SSW feedback, to which STA 2 responds with an ACK. Each packet in the transmit sector sweep includes countdown indication (CDOWN), a Sector ID, and an Antenna ID. The best Sector ID and Antenna ID information are fed back through the Sector Sweep (SSW) Feedback and Sector Sweep (SSW) acknowledgement (ACK) packets.

Figure 8A:
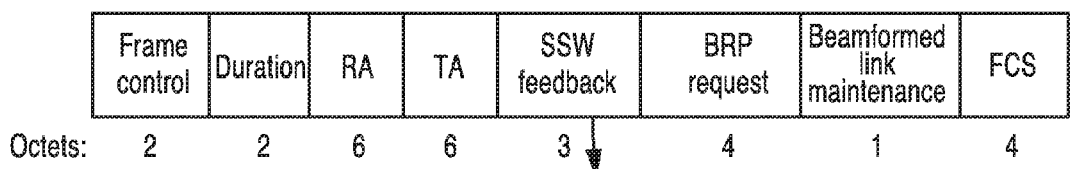
FIG. 8A and FIG. 8B are data field formats of an SSW feedback frame in FIG. 8A, with FIG. 8B detailing bits within the SSW feedback field, as utilized in 802.11ad specifications.
Figure 8B:
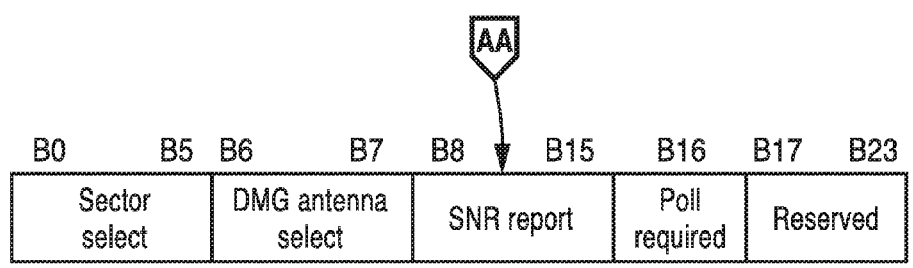

FIG. 8A and FIG. 8B illustrate an SSW feedback frame (FIG. 8A) and the bits within the SSW feedback field (FIG. 8B) of the SSW feedback frame. FIG. 8A depicts data fields for the sector sweep feedback frame (SSW-feedback) frame in the 802.11ad standard. The Duration field is set to 0 when the SSW-Feedback frame is transmitted within an associated beamforming training (A-BFT). Otherwise, the duration field is set to the time, in microseconds, until the end of the current allocation. The RA field contains the MAC address of the STA that is the intended destination of SW-Feedback frame. The TA field contains the MAC address of the STA transmitting the SSW-Feedback frame. The SSW feedback field is explained below. The BRP request field provides information necessary for initiating the BRP process. The Beamformed Link Maintenance field provides the DMG STA with the value of a beam Link Maintenance Time. If the beam Link Maintenance Time elapses, the link operates in quasi-omni Rx mode. In FIG. 8B are seen subfields of SSW feedback, comprising sector select, DMG antenna select, SNR report, poll required flag, and reserved bits.

Two important metrics from the sector sweep (SSW) feedback frame of BF training can be utilized in the present embodiment for making decisions on the reliability of a peer STA. It will be noted that the best Sector ID, Antenna ID, SNR and Beamformed link Maintenance time information are fed back with the Sector Sweep (SSW) Feedback, so that STAs learn directional transmission related information through the BF training process.

The SNR value in the SNR Report field as seen in FIG. 8B is set to the value of the SNR from the frame that was received with best quality during the immediately preceding sector sweep, and which is indicated in the sector select field.

The Beamformed Link Maintenance field provides the DMG STA with the value of a beam Link Maintenance Time (BLMT). If the beam Link Maintenance Time elapses, the link operates in quasi-omni receiver mode. An STA can compare the SNR and the BLMT with specific values and decide on reliability of the neighbor STA link when assessing link reliability.

Figure 9:
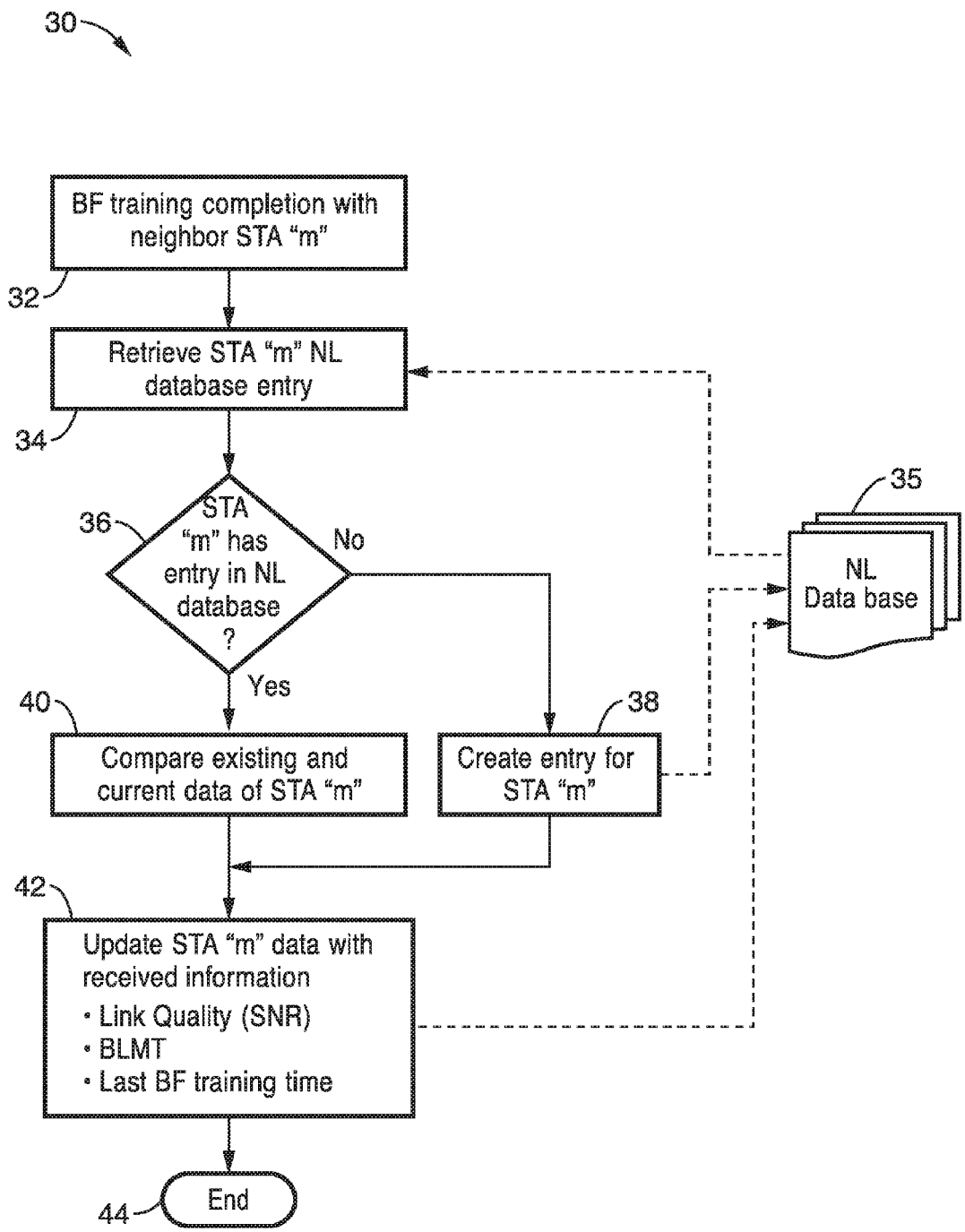
FIG. 9 is a flow diagram of a station recording link reliability information into a neighbor list (NL) data base according to an embodiment of the present disclosure.

FIG. 9 is an example embodiment 30 of a STA recording link reliability related information into its NL Data base. In this process STAs record the link reliability info obtained from the BF training to neighbor list (NL). The recording process is activated per completion of the BF training. In block 32 processing has reached BF training completion with neighbor STA "m", and the STA "m" neighbor list (NL) entry is retrieved 34 from the database. A determination is made in decision block 36, if STA "m" has an entry in the NL database, then a read (fetch) and write process ensues. If there is no entry, then block 38 is executed to create an entry. Otherwise, if an entry exists then the current data (present) for STA "m" is compared 40 to the existing data (previously collected). If there is an existing entry, link quality (e.g., SNR) is calculated using both a value in the NL data base and a value derived from the signal reception, so that the link quality can represent a value considering time variance. For instance, the link quality is updated with a value operating IIR (Infinite Impulse Response) filter, by adopting weighted summation of a value in the NL data base and a value derived from the signal reception. In block 42 the data for STA "m" is updated/saved with received information, such as link quality (e.g., SNR), BLMT, and last BF training time, after which this process ends 44. It will be noted that block 34 received information from NL database 35, while block 38 and 42 update NL database 35 with data.

Figure 10:
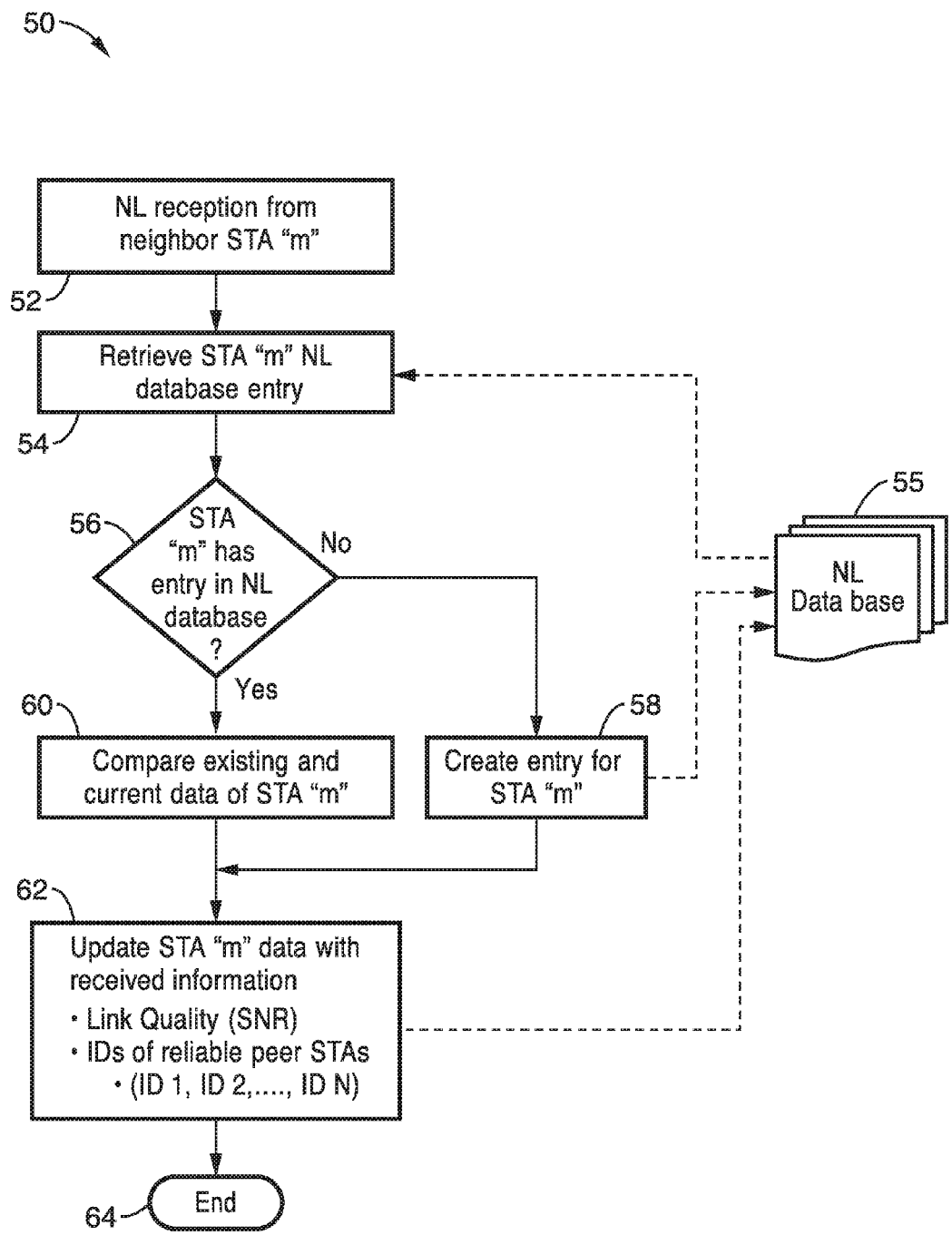
FIG. 10 is a flow diagram of a station recording neighbor list (NL) information into its NL data base according to an embodiment of the present disclosure.

FIG. 10 is an example embodiment 50 of an STA recording neighbor list information into its NL Data base. When a NL is received from a neighbor STA then the STA records the neighbor list information received from its neighbor STA to its internal NL. In block 52 the NL is received from a neighbor STA "m", and the STA "m" NL database entry is retrieved 54 from the NL database 55. A determination 56 is made if there is an NL entry for STA "m" in the database. If there is no entry, then it is created in block 58, otherwise the current entry (present) is compared with the entry existing in the database (previously collected). Some of the data in the NL entry may be updated referring both a value in the NL and a value derived from the signal reception, as stated earlier. In block 62 the data is updated/saved for STA "m", including link quality (e.g., SNR), and IDs of reliable peer STAs (i.e., ID 1, ID2, . . . , ID N), then the process ends 64.

Figure 11:
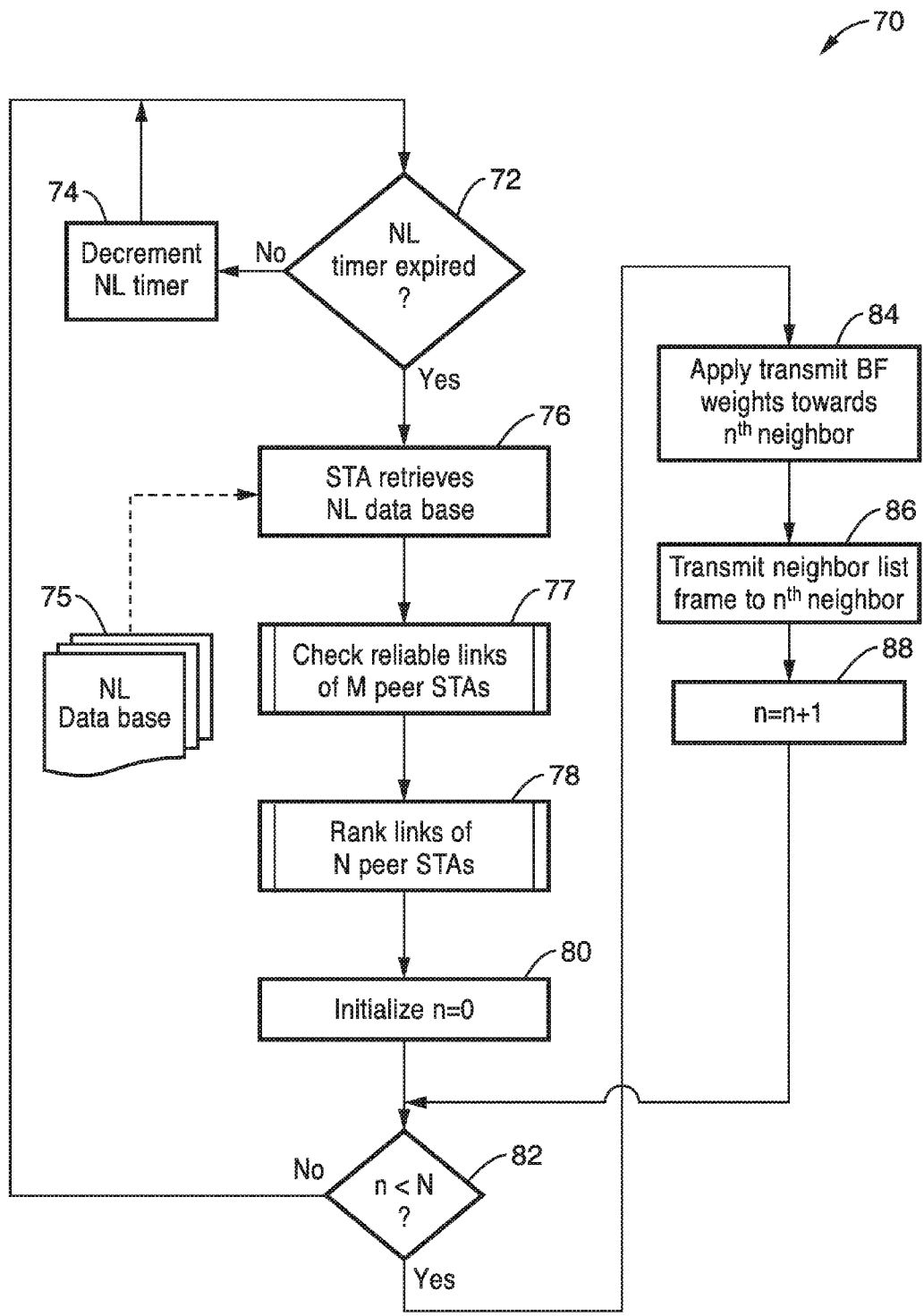
FIG. 11 is a flow diagram of a station periodically transmitting neighbor list (NL) information to its reliable neighbor STAs according to an embodiment of the present disclosure.

FIG. 11 is an example embodiment 70 of a STA periodically transmitting NL information to its reliable neighbor STAs. Starting in the loop at block 72 a determination is made if the NL timer has expired. If it has not expired then the NL timer is decremented 74 for a later return to block 72 for another check. After NL timer expiration, then in block 76 the NL data is retrieved for this station from NL data base 75, and "M" number of reliable peer STAs are found 77. The list of reliable peers is then ranked 78 in a links of "N" peers. A counter value for "n" is then initialized 80 to zero (indicating a 0 peer link). A check is made comparing the number of reliable peer links "N" to this counter value "n". If value "n" is less than "N" then a loop with block 84, 86, 88 is executed for each of the reliable peer links (until n≥N). In step 84 of this loop, transmit beamforming is directed to the $n^{th}$ neighbor, to which NL is transmitted 86, after which the reliable peer counter "n" is advanced 88 (n=n+1), after which the loop exit check 82 is performed again. This proceeds until the NL has been transmitted to each of the reliable peer neighbor STAs.

Figure 12:
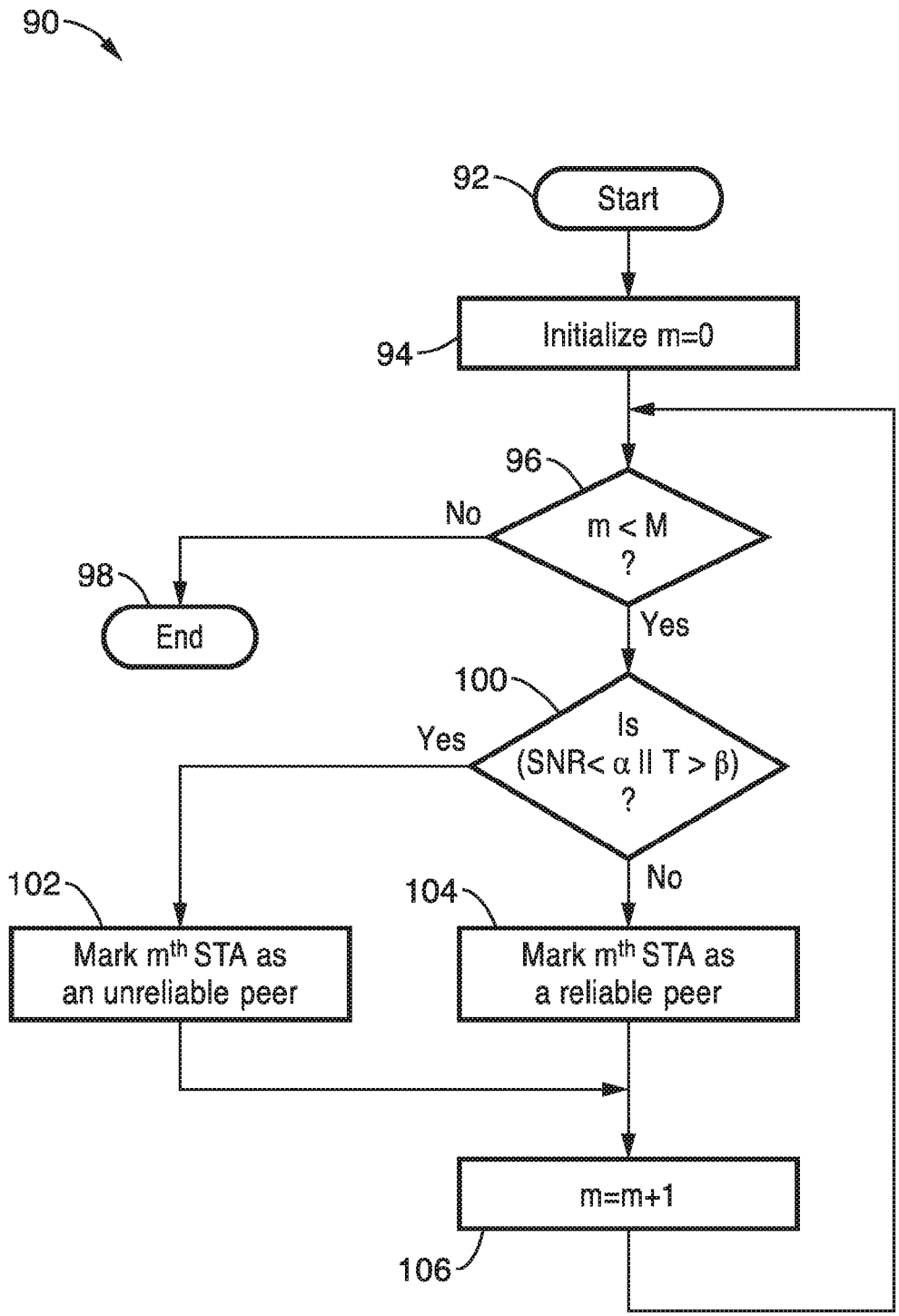
FIG. 12 is a flow diagram of determining reliable peer stations according to an embodiment of the present disclosure.

FIG. 12 illustrates an example embodiment 90 of making the decision on reliable peers, which was shown in block 77 in FIG. 11, and is shown expanded here in FIG. 12 with details of a specific embodiment. It should be noted that there can be up to "M" peer STAs in the NL. Processing starts at block 92 and then initializes 94 a value "m", such as to zero (0). A determination 96 is made if value "m" is less than "M", thus determining if all of the M peers in the NL database have been checked. If m is not less than M, then all of the peers have been processed and execution ends 98. Otherwise, more peers need to be processed, and execution moves to block 100 with a check of link quality (e.g., SNR) and time elapsed since BF training, to evaluate how recent the link quality information is. In particular, the decision determines if SNR is less than a selected threshold ($\alpha$), OR of the BF training time elapsed value has exceeded a selected threshold ($\beta$). If either of these conditions exist, then peer STA m is marked 102 as an unreliable peer. Otherwise, peer STA m is marked 104 as a reliable peer. Block 106 is then executed to increment the peer counter value m, before execution moves back to block 96 at the top of the loop. In the above figure it should be noted that $\alpha$ is the threshold for the SNR value, while $\beta$ is a reliability threshold that depends on BMLT, and $\beta$ must be less than BMLT. In one embodiment $\beta$ is set for ½ BMLT.

Figure 13:
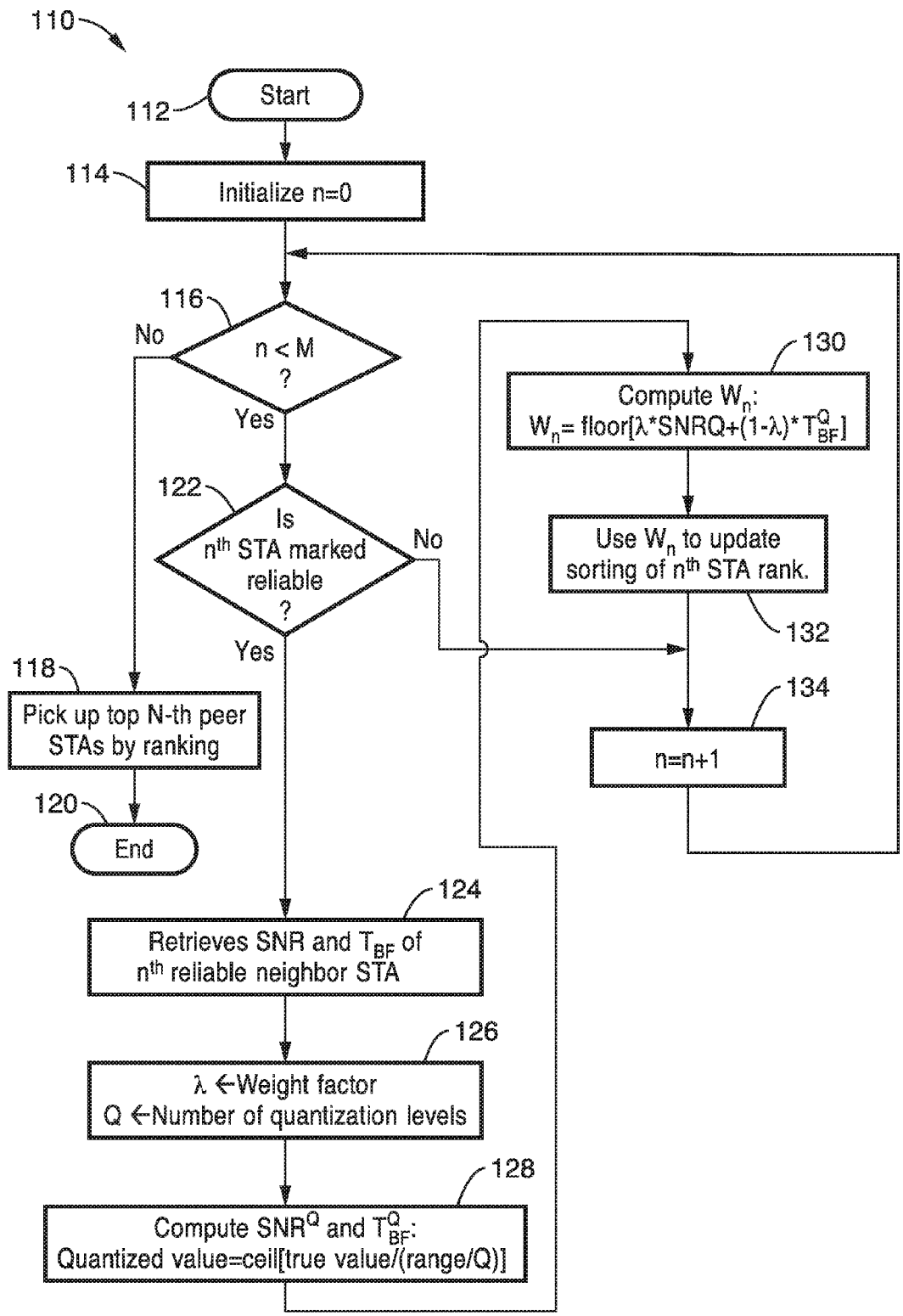
FIG. 13 is a flow diagram of ranking links of N peer stations according to an embodiment of the present disclosure.

FIG. 13 illustrates an example embodiment 110 of ranking links of N peer STAs, which was shown in block 78 in FIG. 11, and is shown expanded here in FIG. 13 with details of a specific embodiment. Execution starts at block 112 and loop counter value "n" is initialized 114. A determination is made 116 if the value "n" is less than the number of peers "M" in the NL database. If n is not less than M, then the passes through the loop have been completed and block 118 is performed to pick up the top N-th peer STAs by ranking, and processing ends 120. Otherwise, execution goes to block 122, where a check is made if the $n^{th}$ STA is marked as reliable. If the STA is reliable, then execution moves to block 124 and the SNR and $T_{BF}$ of the $n^{th}$ reliable neighbor STA are retrieved. Then in block 126 a weight factor ($\lambda$), and a value for a number of quantization levels (Q) are set. In block 128 $SNR^Q$ and $T^Q_{BF}$ is determined with Quantized value determined as ceil[true value/(range/Q)]. After which $W_n$, as expected quality for the link to STA n, is determined 130 as $W_n = \text{floor}[\lambda * SNR^Q + (1-\lambda) * T_{BF}^Q]$. Then the value $W_n$ is used to update 132 the sorting of the $n^{th}$ STA rank. Then the loop counter is incremented 134 as n=n+1 and execution moves back to the top of the loop at block 116. Referring back to decision block 122, if the $n^{th}$ STA was not marked as reliable, then execution would move to this increment block 134, thus skipping this STA, and moving on to the next STA at block 116.

The following describes the ranking of links above in greater detail. Letting W be a ranking metric that quantitatively describes the expected quality of the links between an STA and all of its N reliable neighbor STAs. Then value "W" can be derived for example as a weighted mapping of SNR and time elapsed since BF training ($T_{BF}$). By way of example, one embodiment implements this ranking metric for each neighbor STA: $W = \text{floor}[\lambda * SNR^Q + (1-\lambda) * T_{BF}^Q]$, in which $\lambda$ is a weight factor between 0 and 1 that balances the ranking based on SNR versus time since BF, while $T_{BF} \cdot SNR^Q$ and $T_{BF}^Q$ are the quantized version of SNR and $T_{BF}$, respectively. To implement the above determination, consider the case of quantizing the SNR dynamic range and the time since BF training ($T_{BF}$) range [0,BLMT] each into Q levels. As an example, assume $\lambda$=0.6, that is to say the determination provides slightly more weight to SNR over $T_{BF}$ for computing W. Further assume that Q=8 levels, which allows representing both the SNR value and $T_{BF}$ levels with 3 bits each. Assume, SNR dynamic range of 40 dB and SNR=12, then for SNR we have: $SNR^Q$=ceiling [12/(40/8)]=3. Similarly, with $T_{BF}$=BLMT/2, then $T_{BF}^Q$=ceiling[(BLMT/2)/(BLMT/8)]=4. The result is a weighted rank metric W=[0.6*3+0.4*4]=[1.8+1.6]=[3.2]≅3.

FIG. 14 illustrates an example embodiment of a neighbor list (NL) IE which is contained in the NL frame. Alternatively, the Neighbor List IE may be piggybacked on a different frame, such as a general management frame, for instance a beacon frame, sector sweep frame, or the like. Contents of neighbor list (NL) information element (IE) may include the following. Information Element ID (IE ID) is a number of bits interpreted by the STAs as NL announcement IE. Length value is the length in bytes of the IE. Neighbor STAs ID Field is an ordered list of neighbor STA IDs. STA 1 ID is the ID of the most reliable peer STA, with STA 2 ID being the ID of the second most reliable peer STA, and on through STA N ID as the ID of the least reliable peer STA. A neighbors metric field is a corresponding ranking metric (W) that quantitatively describes the expected quality of the links between a STA and its neighbor STAs. W1 is a ranking number value corresponding to link quality between STA transmitting a frame with this NL IE and STA 1. W2 is a ranking number value corresponding to link quality between STA transmitting a frame with this NL IE and STA 2. W values down through to $W_N$ are provided for up to STA N.

2.4 Discovering Routes to a Destination STA.

Every STA constructs and manages a routing table as an outcome of the route discovery process. A STA constructs a routing table by mapping NL database data and processing of the received RREQ and RREP frames. The information that can be stored in the routing table includes: (a) a table entry which is defined by source STA and destination STA addresses; (b) source STA and destination STA sequence numbers, (c) partial forward (from source to destination) routing paths; (d) partial reverse (from destination to source) routing path and corresponding metric; (e) time of creation of routing path; (f) expiration time for the route table entry.

FIG. 15A through FIG. 15B illustrate example and processing RREQ transmission (FIG. 15A) and reception (FIG. 15B). When an STA queues a transmitting packet and there is no active route to the destination STA of the packet, then the STA initiates an RREQ transmission process as seen in FIG. 15A. In FIG. 15A an example embodiment 150 is shown for RREQ transmission, in which in block source STA queue receives a packet intended for a destination STA "D", after which the RREQ is propagated 154 (shown in more detail in FIG. 16).

When an STA receives a RREQ from its neighbor STA, it updates candidate routes to the RREQ initiator STA. After which it checks if it is the destination of the STA of the RREQ. If it is the destination, it replies with routing reply (RREP). If it is not the destination, then the STA propagates the RREQ to its neighbor STAs. In FIG. 15B an embodiment 160 of RREQ reception is shown, with block 162 representing that the STA receives an RREQ initiated by STA "S", received from a neighbor STA "P", destined for STA "D". Then in block 164 the STA accumulates the link metric value to the metric value in the RREQ. In block 166, if the metric is minimal, then the STA records "P" as the route (next hop) toward "S" in its routing table. A decision is then made in block 168 to determine if this STA is STA "D" (destination STA) of the RREQ. If this is the destination STA, then the STA replies 170 with an RREP. Otherwise, if this is not the destination of the RREQ, then in block 172 the RREQ is propagated to another neighbor toward the destination STA.

Figure 16:
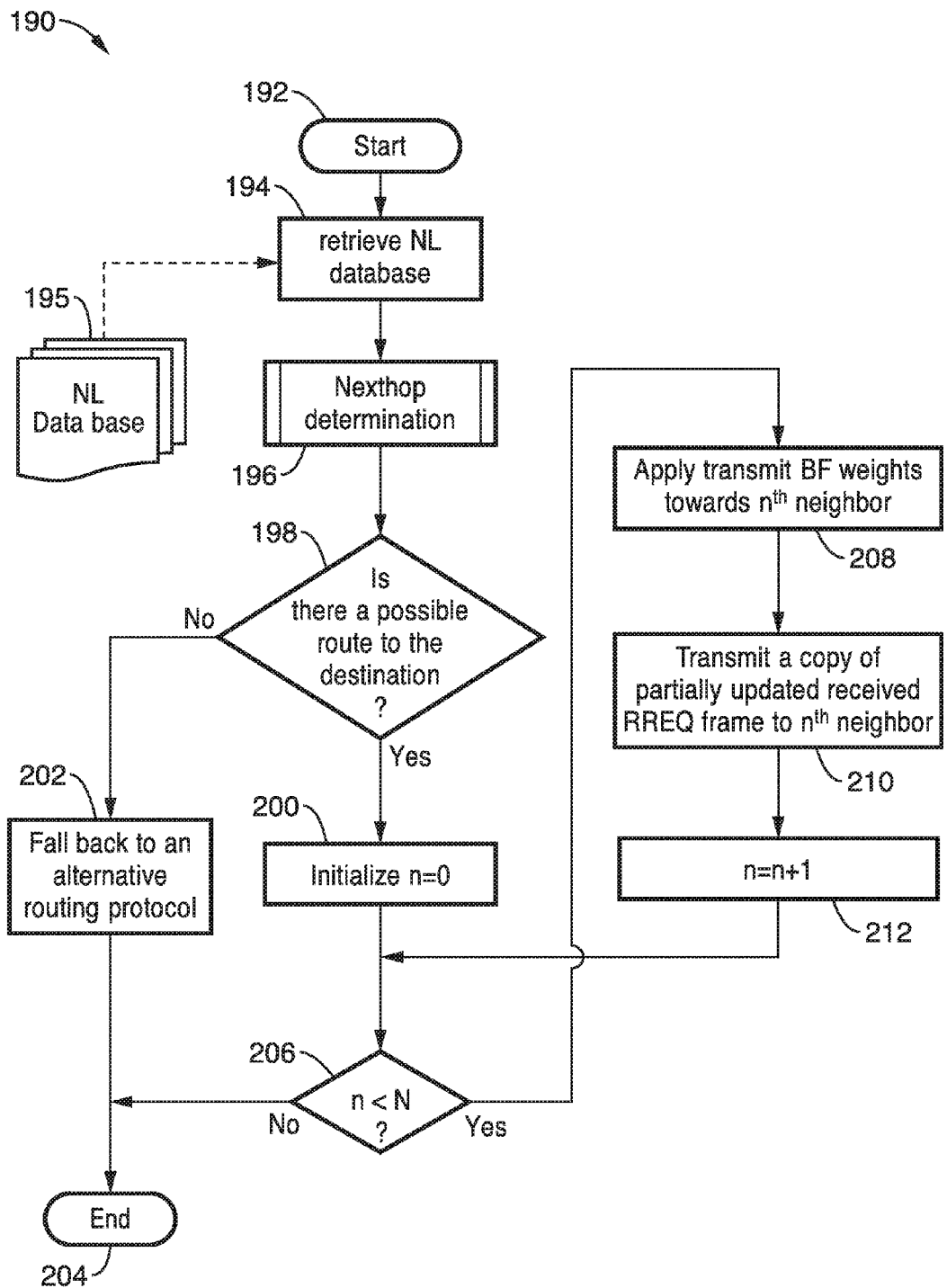
FIG. 16 is a flow diagram of propagating a routing request (RREQ) according to an embodiment of the present disclosure.

FIG. 16 illustrates an example embodiment 190 of propagating an RREQ (was depicted previously in block 154 in FIG. 15A), described here in greater detail. Processing starts at block 192 and then retrieval 194 from the NL database 195 is performed. A next hop determination is made 196 which determines where to make the next hop to reach the destination (selecting an STA on the route to the destination). A decision is made at block 198 to determine if there is a possible route to the destination STA. If there is no route found, then the process moves to block 202 in which the programming falls back and selects an alternative routing protocol, and execution ends 204. Otherwise, with a possible route found, the STA counter "n" is initialized 200 (e.g., n==0), then a check is made 206 on the loop counter, to determine if all n neighbors have been processed. So if n is less than the number of neighbors N, then execution moves to block 208 and BF weights are applied toward the $n^{th}$ neighbor, following by transmitting 210 a copy of partially updated received RREQ frame to the $n^{th}$ neighbor. Then the neighbor counter is incremented 212, and the loop check performed again 206.

Figure 17:
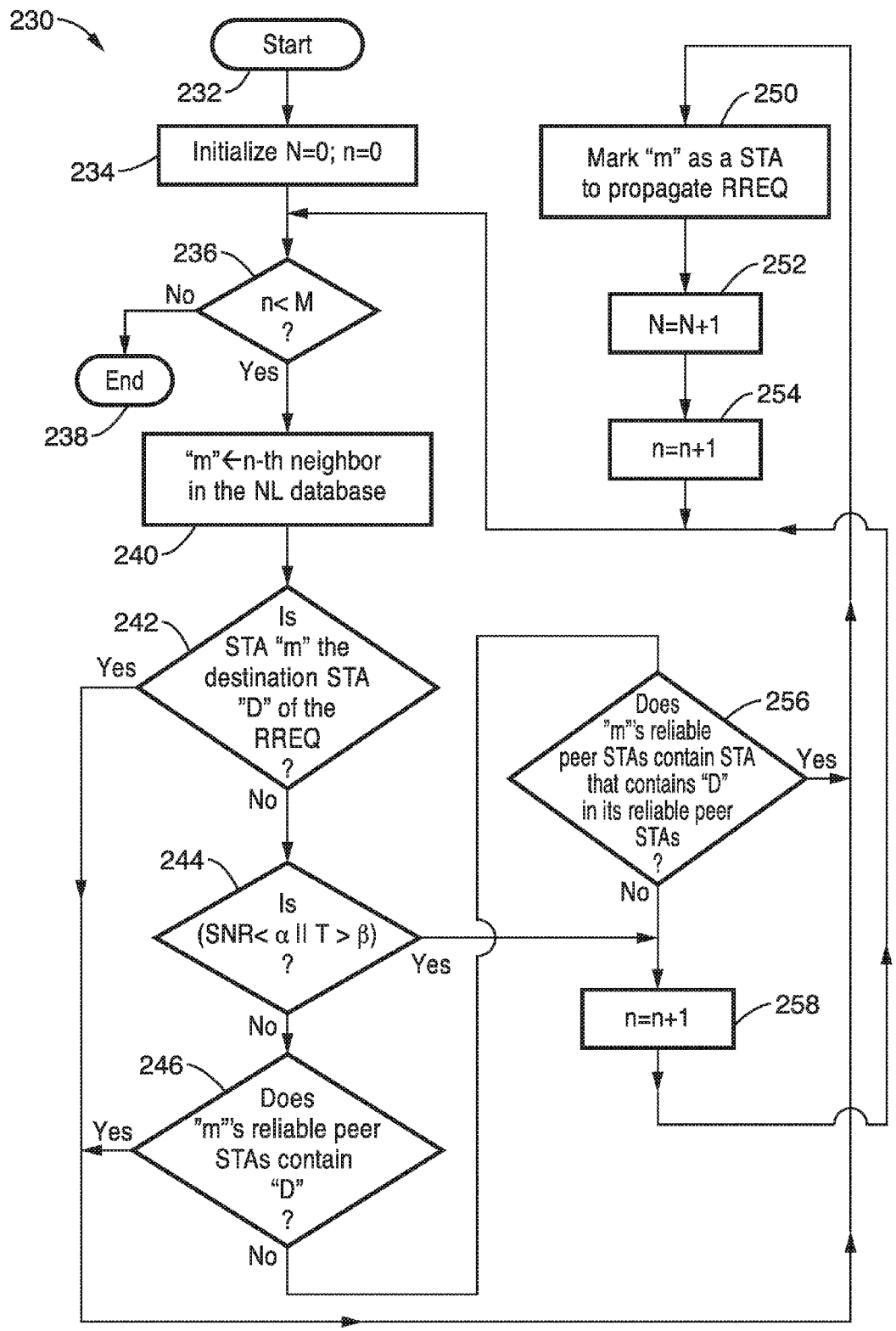
FIG. 17 is a flow diagram of a next hop routing path determination according to an embodiment of the present disclosure.

FIG. 17 is an example embodiment 230 describing in more detail the steps of next hop determination which was seen as block 196 in FIG. 16. In this next hop determination process, RREQ is sent to N neighbor STAs, with the process commencing at block 232, upon which the loop controls are initiated 234 to an initial condition (e.g., N=0; n=0). In block 236 a check is made if the neighbor count n is less than "M" which is the number of peers in the NL database. If this condition is not met, then the process ends 238. On the initial pass this criterion fails only if the neighbor count is zero; afterward this criterion only fails on subsequent passes when the count value of n has attained the neighbor count from the NL. Otherwise the looping is not complete and the value "m" is loaded 240 with the n-th neighbor from the NL database. Then a check is made at block 242 if STA "m" is the destination STA ("D") of the RREQ. If this is the destination, then execution moves directly over to block 250 which marks "m" as a STA to propagate the RREQ, after which the loop counters are incremented, such as N=N+1 in block 252, and n=n+1 at block 254, before returning to the top of the loop at block 236. Considering now block 242, when "m" is not the destination STA ("D"), then block 244 is executed which checks if the link quality is below a threshold, or the time since the last update in link status is beyond a threshold [Is (SNR<α OR T>β)]. If the link quality is sufficient, and timely, then block 246 is executed with a check on whether STA "m" has a reliable peer that is the destination ("D") STA. If this peer contains the destination, then execution moves to block 250 with "m" marked as a STA to propagate the RREQ, then continues on with updating loop counts as previously described. Otherwise, if block 246 finds that the reliable peers of "m" do not contain the destination STA ("D"), then block 256 is executed with a check if the reliable peers of "m" contain STAs that contain "D" as its reliable peer STAs. If these peers don't have a connection to the destination STA ("D"), then block 258 is reached with the STA counter being incremented, and a return is made to block 236 at the top of the main loop. At block 256, if it is found that these peer STAs contain a STA that contains the destination STA ("D"), then execution moves to block 250 with marking this "m" STA to propagate the RREQ. We return now to considering decision block 244; if it is found that either the link quality is low, or too long a time has elapsed (i.e., possible stale link) since link information was obtained, then execution moves to block 258 with the STA counter being incremented and a return made to block 236 at the top of the main loop.

Figure 18:
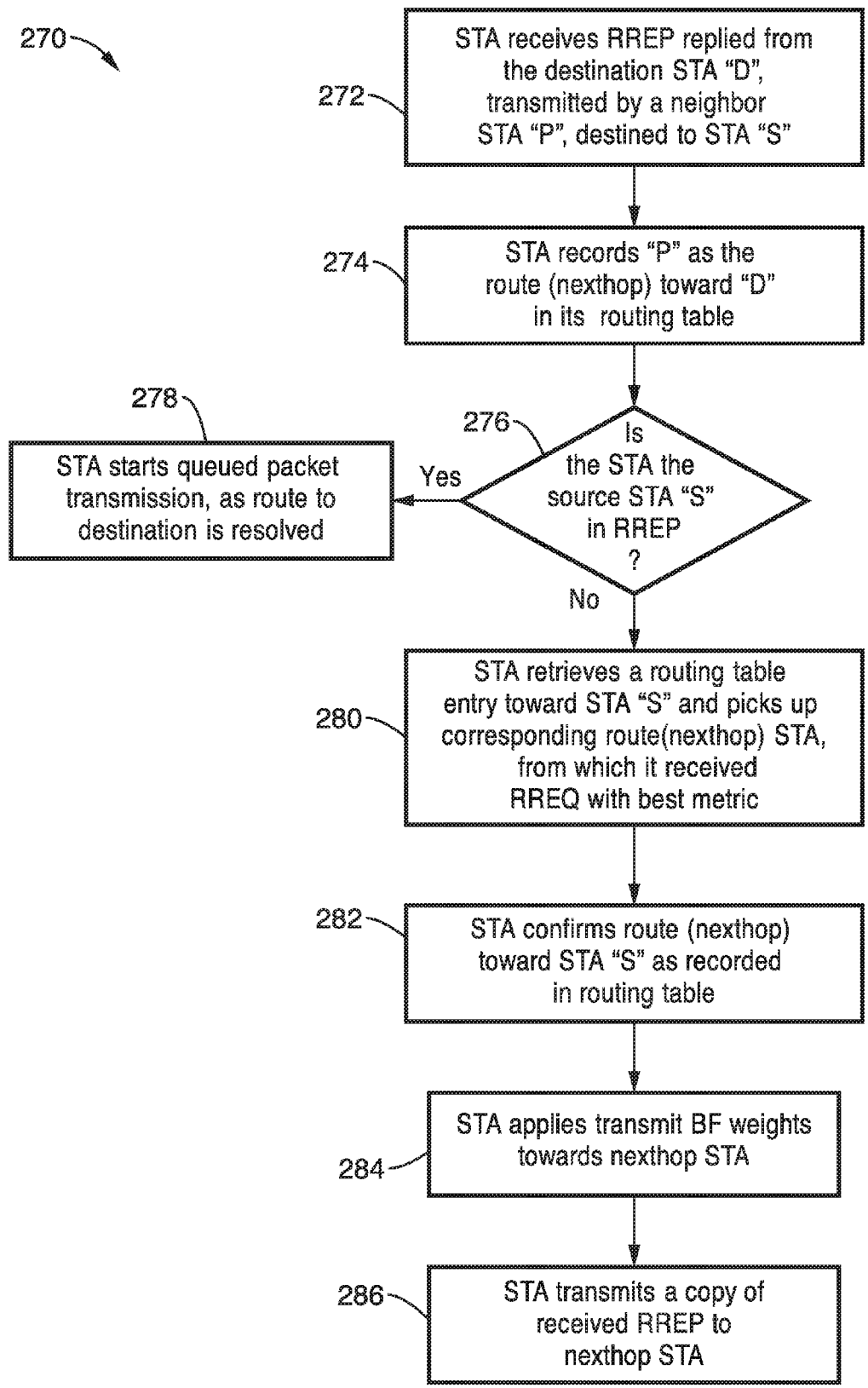
FIG. 18 is a flow diagram of a routing reply (RREP) for a recipient station according to an embodiment of the present disclosure.

FIG. 18 is an example embodiment 270 of RREP recipient STA processing. In block 272 the STA receives an RREP replied from the destination STA "D", transmitted by a neighbor STA "P", destined to STA "S". Then in block 274 the STA records "P" as the route (next hop) toward destination STA "D" in its routing table. A check is made at block 276 if the STA is the source STA "S" in the RREP. If it is this source, then in block 278 the STA starts the queued packet transmission, as the route to the destination is resolved. Otherwise, if the STA is not this source STA "S", then block 280 is executed, in which the STA retrieves a routing table entry toward STA "S" and picks up a corresponding route (next hop) STA from which is received the RREQ with best metric. Then in step 282 the STA confirms route (next hop) toward STA "S" as recorded in the routing table. After which block 284 is executed in which the STA applies transmit BF weights toward the next hop STA, and in block 286 the STA transmits a copy of the received RRE to the next hop STA.

2.5 Overview of Simplified Unicast-Based Routing Requests.

The previous unicast routing scheme consists of a proactive network discovery phase as well as a reactive routing phase where unicast routing requests are transmitted by multiple STAs. This scheme is able to discover a preferred route from the source to the destination. However, the drawbacks are excessive signaling and delay. In another embodiment of the unicast-based routing request the following is performed. (1) Neighbor discovery phase is omitted. (2) The source STA unicasts the routing request first to the neighbor STA 1 with strongest link metric according to the ranking process discussed previously. (3) If the final destination is in the list of STA 1 neighbors, then STA1 forwards the routing request to the destination. Otherwise, STA 1 sends a routing rejection signal back to the source STA. (4) If a routing rejection is received, the source STA keeps unicasting routing requests to neighbor STAs in an order that depends on link metrics until either it receives a routing reply or it considers that there is no two-hop route to the final destination and drops the current data packet. A limitation of the above mechanism is that it works only for two-hop routing. However, this limitation can still be favorable in some types of delay-sensitive applications.

Figure 19:
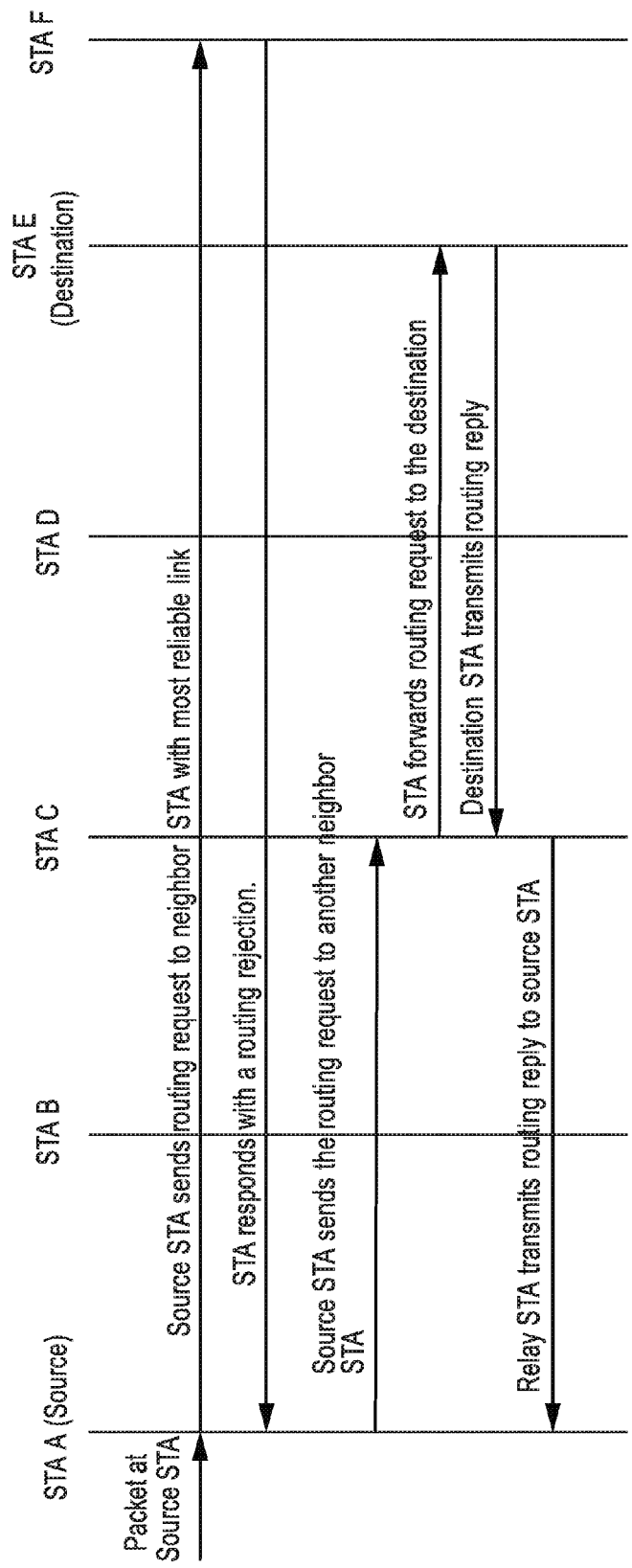
FIG. 19 is a message passing diagram of signaling routing requests to neighbor stations according to an embodiment of the present disclosure.

FIG. 19 illustrates an example signaling sequence of sending routing requests to neighbor STAs for the two-hop routing protocol described above. Each of the example STAs (A-F) are depicted along the top of the chart. At the upper left corner, a packet is received at the source STA A, which sends a routing request to a neighbor STA F, with the most reliable link. Then STA F responds with a routing rejection, to which STA A sends the routing request to another neighbor, which in this case is STA C. STA C finds that it has connection to destination STA E and sends a routing request to STA E as the destination. STA E transmits a routing reply, which STA C then sends back to STA A.

Figure 20:
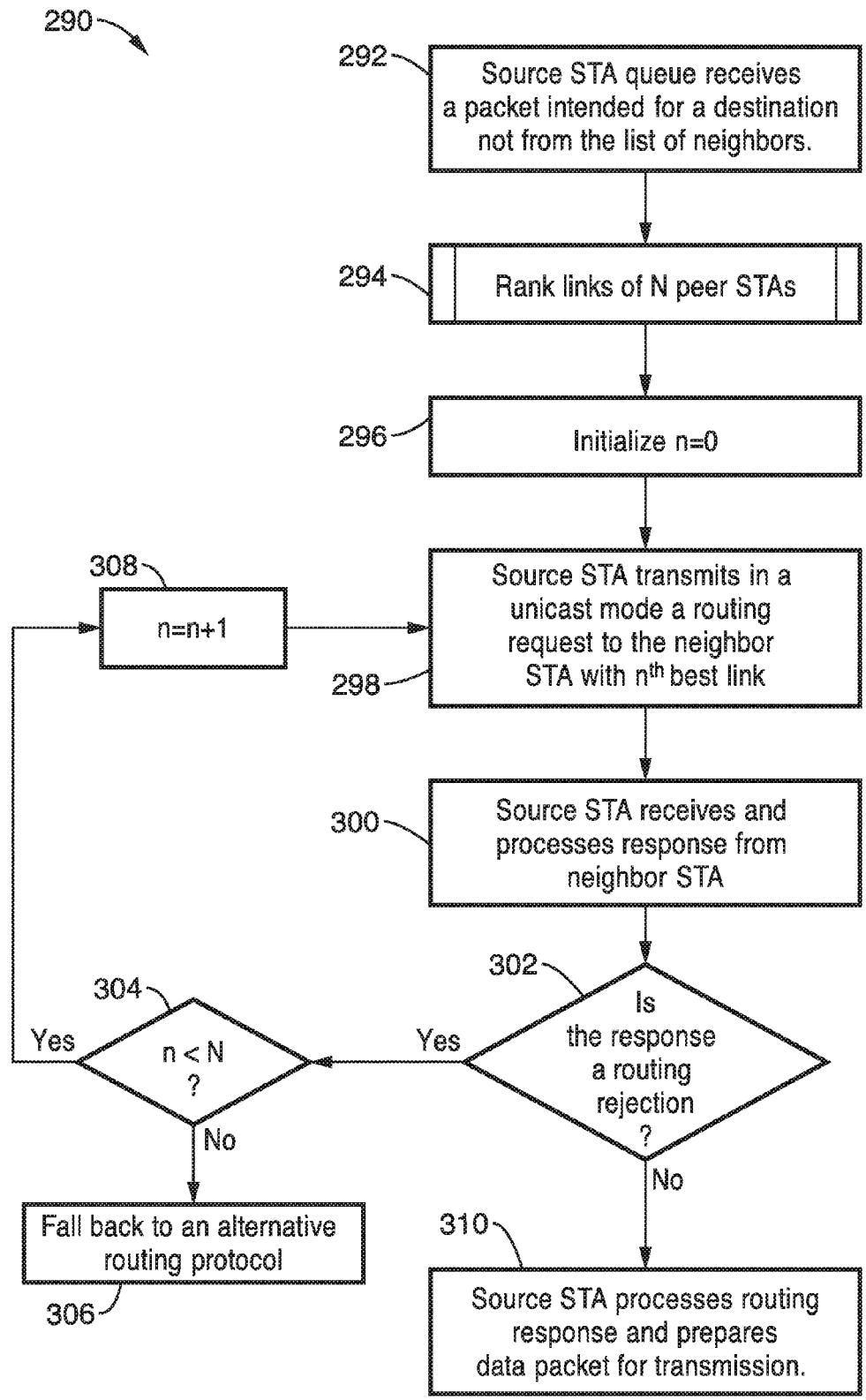
FIG. 20 is a flow diagram of a source station sending unicast-based routing requests according to an embodiment of the present disclosure.

FIG. 20 illustrates an example embodiment 290 of a simplified source STA unicast-based routing request. In block 292 the source STA queue receives a packet intended for a destination that is not found in the list of neighbors (NL), and the STA ranks links 294 of N peer STAs. A neighbor station counter "n" is initialized 296 prior to entry into block 298 at the top of an execution loop. In block 298 the source STA transmits in a unicast mode a routing request to the neighbor STA with the n$^{th}$ best link. The source STA receives and processes 300 the response from neighbor STA. A determination is made 302 if the response is a routing rejection. If the routing was not rejected, then block 310 is executed with the source STA processing the routing response and preparing a data packet for transmission. Otherwise, if the routing request was rejected, then block 304 is executed in which a decision is made if there are any neighbor STAs which have not been checked (is n<N?). If it is determined in block 304 that all neighbors have been checked, then (n is not <N) the processing falls back and selects 306 an alternative routing protocol. Otherwise, if there are unchecked neighbors, then the 'neighbor' counter is incremented 308 (n=n+1) and a return to the top of the loop is made to block 298.

Figure 21:
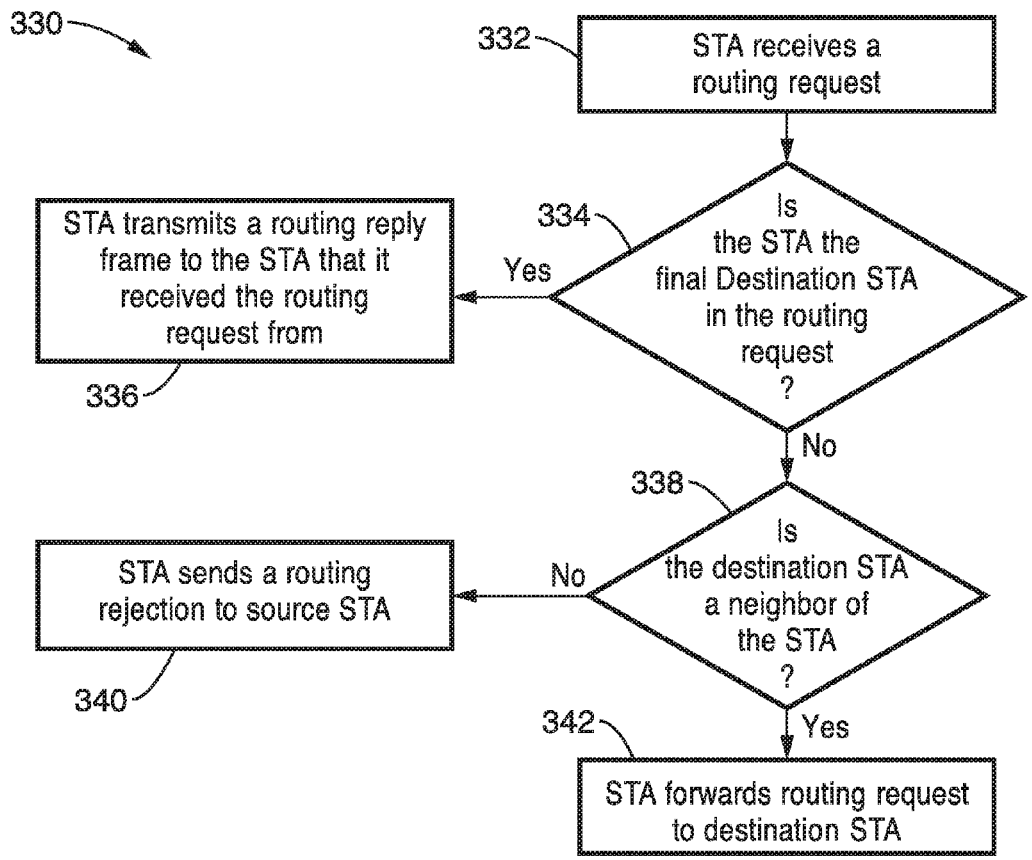
FIG. 21 is a flow diagram of simplified routing-request processing for a recipient station according to an embodiment of the present disclosure.

FIG. 21 illustrates an example embodiment 330 of a simplified routing-request processing for a recipient STA. In block 332 the STA (recipient) receives a routing request, and a decision is made 334 on whether this STA is the final destination STA "D" in the routing request. If this is the final destination STA, then block 336 is executed with the STA transmitting a routing reply frame to the STA from which it received the routing request. Otherwise, if in block 334 it is determined that the STA is not the destination STA, then decision block 338 is entered in which it is determined if the destination STA "D" is a neighbor of the STA. If it is a neighbor, then block 342 is executed with the STA forwarding the routing request to a destination STA. Otherwise, since no neighbors of the STA are found to be the destination STA, then block 340 is executed in which the STA sends a routing rejection to the source STA.

Figure 22:
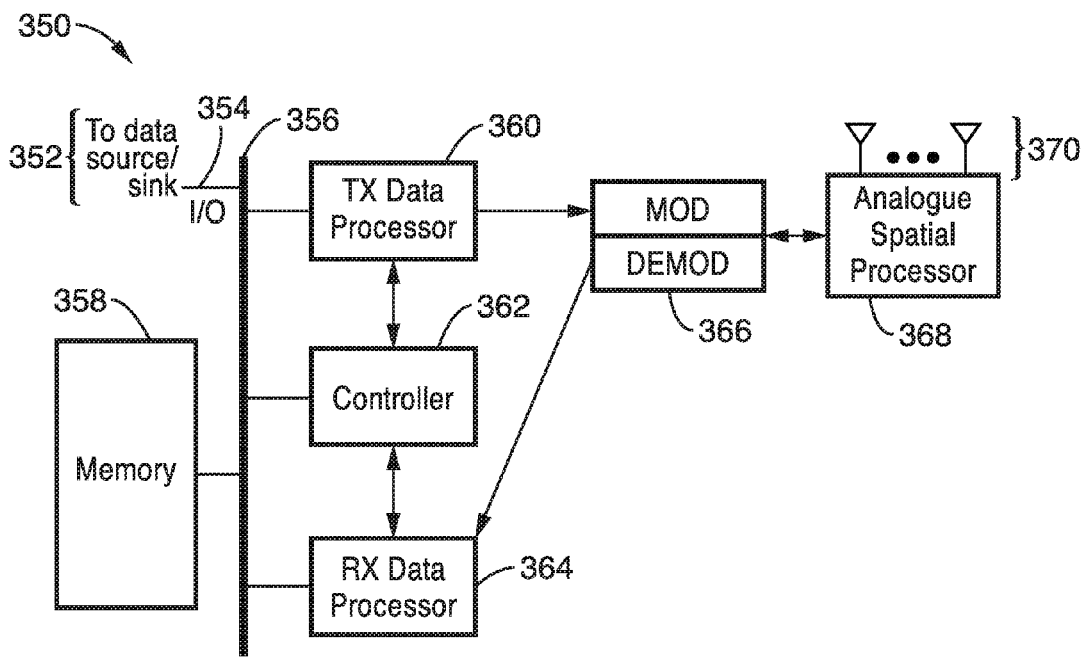
FIG. 22 is a block diagram for single-input-single-output (SISO) station (STA) hardware according to an embodiment of the present disclosure.

FIG. 22 illustrates an example embodiment 350 of a single-input-single-output (SISO) station (STA) hardware configuration. Signals 352 are transmitted/received by a communication link or I/O connection 354, which is seen coupled through an internal bus 356. Bus 356 interconnects memory 358, transmit (TX) data processor 360, controller (e.g., computer processor) 362, and a receiver (RX) data processor 364. A modulator/demodulator 366 is shown with its modulator receiving outputs from the TX data processor 360, and its demodulator generating outputs to the RX data processor 364. Modulator/demodulator 366 is coupled to an analog spatial processor 368 configured with a plurality of beamforming antennas 370.

When the station operates beamforming to a transmitting signal, the beam pattern for use is commanded from TX Data Processor 360 to the modulator/demodulator 366. The modulator/demodulator interprets the given command and generates a command that is fed to Analogue Spatial Processor 368. As a result, Analogue Spatial Processor 368 will shift phases in each of its transmitting antenna elements to form the commanded beam pattern. When the station operates beamforming to a receiving signal, the beam pattern for use is commanded from the Controller 362 and RX Data Processor 360 to the modulator/demodulator 366. The modulator/demodulator interprets the given command and generates a command that is fed to Analogue Spatial Processor 368. As a result, Analogue Spatial Processor 368 will shift phases in each of its receiving antenna elements to form the commanded beam pattern. When the station receives a signal, the received signal is fed to Controller 362, via Analogue Spatial Processor 378, modulator/demodulator 366, and RX Data Processor 364. The Controller 362 determines the content of the received signal, and triggers appropriate reactions, and store information in Memory 358 as described above. The Neighbor List data base is stored in Memory 358 and fetched by Controller 362. All the management frames, exchanged packets described above are determined and generated by Controller 362. When a packet is to be transmitted on the air as a response to an action to manage NL data base or routing information, the packet generated by the Controller 362 is fed to Analogue Spatial Processor 368 via TX Data Processor 360 and modulator/demodulator 366, whereas the transmitting beam pattern is controlled as described above simultaneously.

Figure 23:
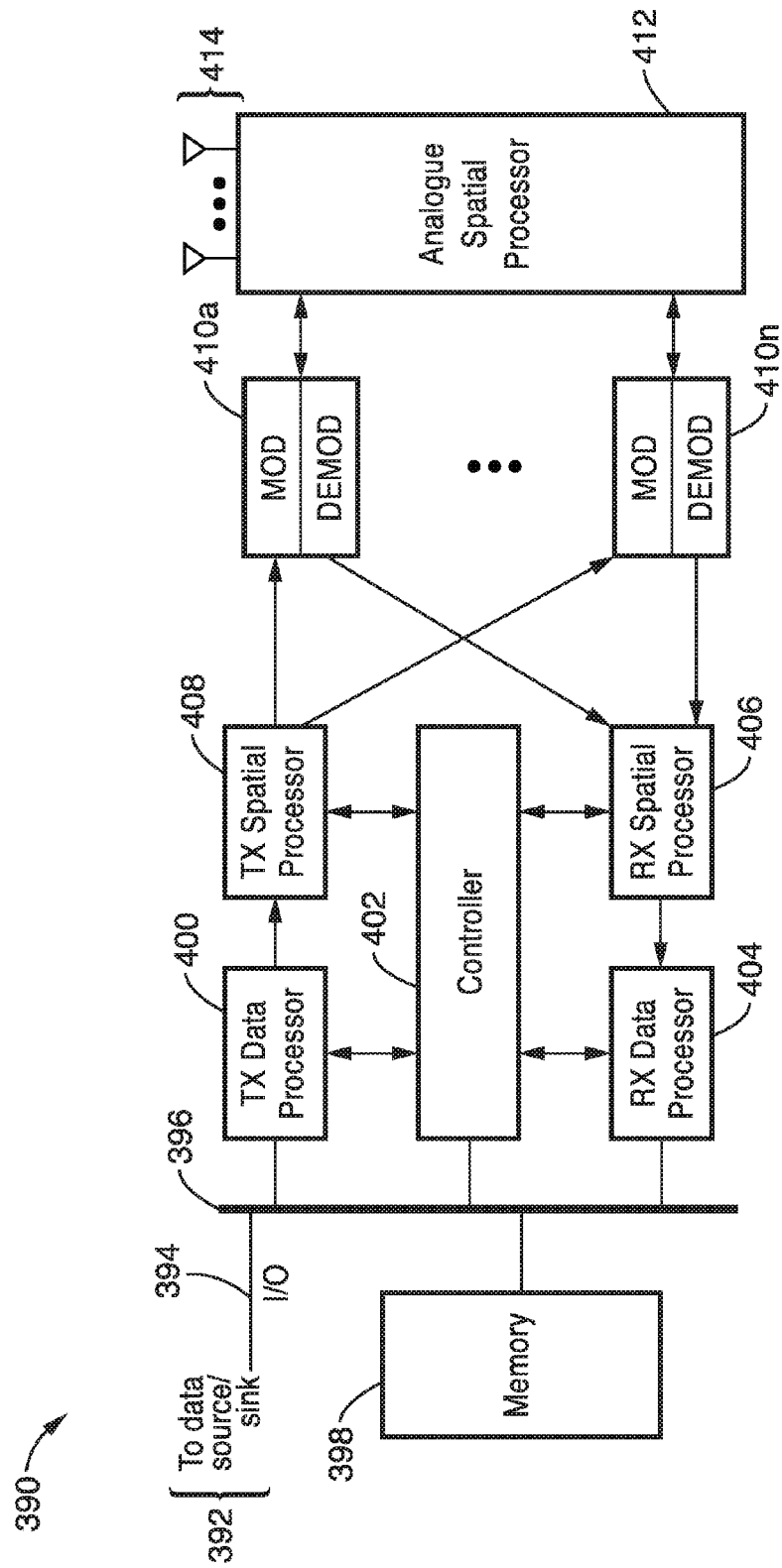
FIG. 23 is a block diagram for multiple-input-multiple-output (MIMO) station (STA) hardware according to an embodiment of the present disclosure.

FIG. 23 illustrates an example embodiment 390 of a multiple-input-multiple-output (MIMO) station (STA) hardware configuration. Signals 392 are transmitted/received by a communication link, or I/O connection 394, which is seen coupled through an internal bus 396. Bus 396 interconnects memory 398, transmit (TX) data processor 400, controller (e.g., computer processor) 402, and a receiver (RX) data processor 404. Additional processors are coupled to controller 402, exemplified as a transmit spatial (TX) processor 408 and a receiver (RX) spatial processor 406. Modulator/demodulators 410a through 410n are coupled to the TX and RX spatial processors, with each modulator/demodulator in turn coupled to the analog spatial processor 412, with its plurality of beamforming antennas 414.

When the station operates beamforming to a transmitting signal, the beam pattern and MIMO configuration for use is commanded from TX Data Processor 400 to the TX Spatial Processor 408, for modulators/demodulators 410a through 410n, which interpret the given command and generate commands fed to Analogue Spatial Processor 412. As a result, Analogue Spatial Processor 412 shifts phases in each of its transmitting antenna elements to form the commanded beam pattern and MIMO configuration. When the station operates beamforming to a receiving signal, the beam pattern for use is commanded from Controller 402 and RX Data Processor 404 to the modulators/demodulators 410a through 410n, which interpret the given command and generate commands that are fed to Analogue Spatial Processor 412. As a result, Analogue Spatial Processor 412 shifts phases in each of its receiving antenna elements to form the commanded beam pattern with MIMO configuration. When the station receives a signal, the received signal is fed to Controller 402, via Analogue Spatial Processor 412, modulators/demodulators 410a-410n, and RX Data Processor 404. The Controller 402 determines the content of the received signal, and triggers appropriate reactions, and store information in Memory 398 as described above. The Neighbor List data base is stored in Memory 398 and fetched by Controller 402. All the management frames, exchanged packets described above are determined and generated by Controller 402. When a packet is to be transmitted as a response to an action to manage the NL or routing information, the packet generated by the Controller 402 is fed to Analogue Spatial Processor 412 via TX Data Processor 400, TX Spatial Processor 408, and modulators/demodulators 410a through 410n, whereas the transmitting beam pattern are controlled as described above simultaneously.

The enhancements described in the presented technology can be readily implemented within various peer devices configured for wireless network communication. It should also be appreciated that wireless network communication peer devices are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the majority of diagrams for the sake of simplicity of illustration, as one of ordinary skill in the art recognizes the use of computer devices for carrying out steps involved with network communication. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for communicating via a routing protocol in a wireless network having directional transmission, comprising: (a) a transceiver configured for communicating over a wireless network with peer stations; (b) a computer processor coupled to said transceiver; and (c) a non-transitory computer-readable memory storing instructions executable by the computer processor; (d) wherein said instructions, when executed by the computer processor, perform steps comprising: (d)(i) identifying reliable peer stations utilizing Beamforming (BF) training feedback metrics among the neighboring wireless device; (d)(ii) transmitting routing discovery messages to reliable peer stations in a unicast transmission mode; (d)(iii) disseminating neighborhood discovery lists among peer station on the network in a unicast transmission mode; and (d)(iv) constructing routing tables that extract best route between a source and a destination station, wherein messages can be routed using said routing table from a source peer station, through intermediate peer stations, to a destination peer station.

2. The apparatus of any preceding embodiment, further comprising using a ranking of links to peer stations based on said Beamforming (BF) training feedback metrics to transmit routing requests in a specific order.

3. The apparatus of any preceding embodiment, wherein said Beamforming (BF) training comprises: (A) training an initiator peer station with an initiator sector sweep (ISS); (B) training a responder peer station with a responder sector sweep (RSS); (C) returning sector sweep (SSW) feedback, and (D) generating a sector sweep (SSW) acknowledgement (ACK).

4. The apparatus of any preceding embodiment, wherein said routing table comprises: (A) source station address; (B) destination station address; (C) source station sequence number; (D) destination station sequence number; (E) partial forward routing paths; (F) partial reverse routing path and corresponding metric; (G) time of routing path creation; (H) expiration time for route table entry.

5. The apparatus of any preceding embodiment, wherein said transceiver comprises a single-input-single-output (SISO) transmitter and receiver.

6. The apparatus of any preceding embodiment, wherein said transceiver comprises a multiple-input-multiple-output (MIMO) transmitter and receiver.

7. The apparatus of any preceding embodiment, wherein said transceiver, comprises: (A) at least one transmitter data processor, coupled to a modulator input of at least one modulator/demodulator which is coupled to an analog spatial processor configured for connection to an antenna array; and (B) at least one receiver data processor, receiving demodulator output from the at least one modulator/demodulator which is coupled to the analog spatial processor configured for connection to the antenna array.

8. The apparatus of any preceding embodiment, wherein said transceiver further comprises: (C) at least one transmitter spatial processor coupled between each of said at least one transmitter data processors and each of said at least one modulator/demodulator; and (D) at least one receiver spatial processor coupled between each of said at least one receiver data processors and each of said at least one modulator/demodulators.

9. The apparatus of any preceding embodiment, wherein said wireless network with peer stations comprises an ad-hoc network.

10. The apparatus of any preceding embodiment, wherein said peer station comprises a logical entity as a singly addressable instance of a medium access control (MAC) and physical layer (PHY) interface to the wireless network.

11. An apparatus for communicating via a two-hop simplified routing protocol in a wireless network having directional transmission, comprising: (a) a transceiver configured for communicating over a wireless network with peer stations; (b) a computer processor coupled to said transceiver; and (c) a non-transitory computer-readable memory storing instructions executable by the computer processor; (d) wherein said instructions, when executed by the computer processor, perform steps comprising: (d)(i) managing neighborhood information at each station (STA) performed locally; (d)(ii) ranking reliable links based on beamforming (BF) training feedback; and (d)(iii) transmitting routing discovery messages in a unicast transmission mode in an order.

12. The apparatus of any preceding embodiment, wherein said Beamforming (BF) training comprises: (A) training an initiator peer station with an initiator sector sweep (ISS); (B) training a responder peer station with a responder sector sweep (RSS); (C) returning sector sweep (SSW) feedback, and (D) generating a sector sweep (SSW) acknowledgement (ACK).

13. The apparatus of any preceding embodiment, wherein said routing table comprises: (A) source station address; (B) destination station address; (C) source station sequence number; (D) destination station sequence number; (E) partial forward routing paths; (F) partial reverse routing path and corresponding metric; (G) time of routing path creation; (H) expiration time for route table entry.

14. The apparatus of any preceding embodiment, wherein said transceiver comprises a single-input-single-output (SISO) transmitter and receiver.

15. The apparatus of any preceding embodiment, wherein said transceiver comprises a multiple-input-multiple-output (MIMO) transmitter and receiver.

16. The apparatus of any preceding embodiment, wherein said transceiver, comprises: (A) at least one transmitter data processor, coupled to a modulator input of at least one modulator/demodulator which is coupled to an analog spatial processor configured for connection to an antenna array; and (B) at least one receiver data processor, receiving demodulator output from the at least one modulator/demodulator which is coupled to the analog spatial processor configured for connection to the antenna array.

17. The apparatus of any preceding embodiment, wherein said transceiver further comprises: (C) at least one transmitter spatial processor coupled between each of said at least one transmitter data processors and each of said at least one modulator/demodulator; and (D) at least one receiver spatial processor coupled between each of said at least one receiver data processors and each of said at least one modulator/demodulators.

18. The apparatus of any preceding embodiment, wherein said wireless network with peer stations comprises an ad-hoc network.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for communicating via a routing protocol in a wireless network having directional transmission, comprising:
    (a) a transceiver configured for communicating over a wireless network with peer stations;
    (b) a computer processor coupled to said transceiver; and
    (c) a non-transitory computer-readable memory storing instructions executable by the computer processor;
    (d) wherein said instructions, when executed by the computer processor, perform steps comprising:
        (i) identifying reliable peer stations utilizing Beamforming (BF) training feedback metrics among the neighboring wireless device;
        (ii) transmitting routing discovery messages to reliable peer stations in a unicast transmission mode;
        (iii) disseminating neighborhood discovery lists among peer station on the network in a unicast transmission mode; and
        (iv) constructing routing tables that extract best route between a source and a destination station, wherein messages can be routed using said routing table from a source peer station, through intermediate peer stations, to a destination peer station, and wherein said routing table comprises: (A) source station address; (B) destination station address; (C) source station sequence number; (D) destination station sequence number; (E) partial forward routing paths; (F) partial reverse routing path and corresponding metric; (G) time of routing path creation; (H) expiration time for route table entry.

2. The apparatus as recited in claim 1, further comprising using a ranking of links to peer stations based on said Beamforming (BF) training feedback metrics to transmit routing requests in a specific order.

3. The apparatus as recited in claim 1, wherein said Beamforming (BF) training comprises: (A) training an initiator peer station with an initiator sector sweep (ISS); (B) training a responder peer station with a responder sector sweep (RSS); (C) returning sector sweep (SSW) feedback, and (D) generating a sector sweep (SSW) acknowledgement (ACK).

4. The apparatus as recited in claim 1, wherein said transceiver comprises a single-input-single-output (SISO) transmitter and receiver.

5. The apparatus as recited in claim 1, wherein said transceiver comprises a multiple-input-multiple-output (MIMO) transmitter and receiver.

6. The apparatus as recited in claim 1, wherein said transceiver, comprises:
(A) at least one transmitter data processor, coupled to a modulator input of at least one modulator/demodulator which is coupled to an analog spatial processor configured for connection to an antenna array; and
(B) at least one receiver data processor, receiving demodulator output from the at least one modulator/demodulator which is coupled to the analog spatial processor configured for connection to the antenna array.

7. The apparatus as recited in claim 6, wherein said transceiver further comprises:
(C) at least one transmitter spatial processor coupled between each of said at least one transmitter data processors and each of said at least one modulator/demodulator; and
(D) at least one receiver spatial processor coupled between each of said at least one receiver data processors and each of said at least one modulator/demodulator.

8. The apparatus as recited in claim 1, wherein said wireless network with peer stations comprises an ad-hoc network.

9. The apparatus as recited in claim 1, wherein said peer station comprises a logical entity as a singly addressable instance of a medium access control (MAC) and physical layer (PHY) interface to the wireless network.

10. An apparatus for communicating via a two-hop simplified routing protocol in a wireless network having directional transmission, comprising:
(a) a transceiver configured for communicating over a wireless network with peer stations;
(b) a computer processor coupled to said transceiver; and
(c) a non-transitory computer-readable memory storing instructions executable by the computer processor;
(d) wherein said instructions, when executed by the computer processor, perform steps comprising:
(i) managing neighborhood information at each station (STA) performed locally;
(ii) ranking reliable links based on beamforming (BF) training feedback;
(iii) transmitting routing discovery messages in a unicast transmission mode in an order; and
(iv) constructing routing tables between a source and a destination station, wherein messages can be routed using said routing table from a source peer station, through intermediate peer stations, to a destination peer station, and wherein said routing table comprises: (A) source station address; (B) destination station address; (C) source station sequence number; (D) destination station sequence number; (E) partial forward routing paths; (F) partial reverse routing path and corresponding metric; (G) time of routing path creation; (H) expiration time for route table entry.

11. The apparatus as recited in claim 10, wherein said Beamforming (BF) training comprises: (A) training an initiator peer station with an initiator sector sweep (ISS); (B) training a responder peer station with a responder sector sweep (RSS); (C) returning sector sweep (SSW) feedback, and (D) generating a sector sweep (SSW) acknowledgement (ACK).

12. The apparatus as recited in claim 10, wherein said transceiver comprises a single-input-single-output (SISO) transmitter and receiver.

13. The apparatus as recited in claim 10, wherein said transceiver comprises a multiple-input-multiple-output (MIMO) transmitter and receiver.

14. The apparatus as recited in claim 10, wherein said transceiver, comprises:
(A) at least one transmitter data processor, coupled to a modulator input of at least one modulator/demodulator which is coupled to an analog spatial processor configured for connection to an antenna array; and
(B) at least one receiver data processor, receiving demodulator output from the at least one modulator/demodulator which is coupled to the analog spatial processor configured for connection to the antenna array.

15. The apparatus as recited in claim 14, wherein said transceiver further comprises:
(C) at least one transmitter spatial processor coupled between each of said at least one transmitter data processors and each of said at least one modulator/demodulator; and
(D) at least one receiver spatial processor coupled between each of said at least one receiver data processors and each of said at least one modulator/demodulator.

16. The apparatus as recited in claim 10, wherein said wireless network with peer stations comprises an ad-hoc network.

17. An apparatus for communicating via a routing protocol in a wireless network having directional transmission, comprising:
(a) a transceiver configured for communicating over a wireless network with peer stations;
(b) wherein said transceiver comprises: (A) at least one transmitter data processor, coupled to a modulator input of at least one modulator/demodulator which is coupled to an analog spatial processor configured for connection to an antenna array; and (B) at least one receiver data processor, receiving demodulator output from the at least one modulator/demodulator which is coupled to the analog spatial processor configured for connection to the antenna array;
(c) a computer processor coupled to said transceiver; and
(d) a non-transitory computer-readable memory storing instructions executable by the computer processor;
(e) wherein said instructions, when executed by the computer processor, perform steps comprising:
(i) identifying reliable peer stations utilizing Beamforming (BF) training feedback metrics among the neighboring wireless device;
(ii) transmitting routing discovery messages to reliable peer stations in a unicast transmission mode;
(iii) disseminating neighborhood discovery lists among peer station on the network in a unicast transmission mode; and (iv) constructing routing tables that extract best route between a source and a destination station, wherein messages can be routed using said routing table from a source peer station, through intermediate peer stations, to a destination peer station.

18. The apparatus as recited in claim 17, wherein said transceiver further comprises (b)(C) at least one transmitter spatial processor coupled between each of said at least one transmitter data processors and each of said at least one modulator/demodulator; and (b)(D) at least one receiver spatial processor coupled between each of said at least one receiver data processors and each of said at least one modulator/demodulator.

19. The apparatus as recited in claim 17, further comprising using a ranking of links to peer stations based on said Beamforming (BF) training feedback metrics to transmit routing requests in a specific order.

20. The apparatus as recited in claim 17, wherein said Beamforming (BF) training comprises: (A) training an initiator peer station with an initiator sector sweep (ISS); (B) training a responder peer station with a responder sector sweep (RSS); (C) returning sector sweep (SSW) feedback, and (D) generating a sector sweep (SSW) acknowledgement (ACK).

21. The apparatus as recited in claim 17, wherein said wireless network with peer stations comprises an ad-hoc network.

22. The apparatus as recited in claim 17, wherein said peer station comprises a logical entity as a singly addressable instance of a medium access control (MAC) and physical layer (PHY) interface to the wireless network.

23. The apparatus as recited in claim 17, wherein said transceiver comprises either a single-input-single-output (SISO) transmitter and receiver, or a multiple-input-multiple-output (MIMO) transmitter and receiver.

24. The apparatus as recited in claim 17, wherein said wireless network with peer stations comprises an ad-hoc network.

25. An apparatus for communicating via a two-hop simplified routing protocol in a wireless network having directional transmission, comprising:
(a) a transceiver configured for communicating over a wireless network with peer stations;
(b) wherein said transceiver, comprises: (A) at least one transmitter data processor, coupled to a modulator input of at least one modulator/demodulator which is coupled to an analog spatial processor configured for connection to an antenna array; and (B) at least one receiver data processor, receiving demodulator output from the at least one modulator/demodulator which is coupled to the analog spatial processor configured for connection to the antenna array;
(c) a computer processor coupled to said transceiver; and
(d) a non-transitory computer-readable memory storing instructions executable by the computer processor;
(e) wherein said instructions, when executed by the computer processor, perform steps comprising:
(i) managing neighborhood information at each station (STA) performed locally;
(ii) ranking reliable links based on beamforming (BF) training feedback; and
(iii) transmitting routing discovery messages in a unicast transmission mode in an order.

26. The apparatus as recited in claim 25, wherein said transceiver further comprises (b)(C) at least one transmitter spatial processor coupled between each of said at least one transmitter data processors and each of said at least one modulator/demodulator; and (b)(D) at least one receiver spatial processor coupled between each of said at least one receiver data processors and each of said at least one modulator/demodulator.

27. The apparatus as recited in claim 25, wherein said Beamforming (BF) training comprises: (A) training an initiator peer station with an initiator sector sweep (ISS); (B) training a responder peer station with a responder sector sweep (RSS); (C) returning sector sweep (SSW) feedback, and (D) generating a sector sweep (SSW) acknowledgement (ACK).

28. The apparatus as recited in claim 25, wherein said transceiver comprises either a single-input-single-output (SISO) transmitter and receiver, or a multiple-input-multiple-output (MIMO) transmitter and receiver.

29. The apparatus as recited in claim 25, wherein said wireless network with peer stations comprises an ad-hoc network.

* * * * *